United States Patent [19]
Kruger et al.

[11] Patent Number: 5,902,538
[45] Date of Patent: May 11, 1999

[54] SIMPLIFIED STEREOLITHOGRAPHIC OBJECT FORMATION METHODS OF OVERCOMING MINIMUM RECOATING DEPTH LIMITATIONS

[75] Inventors: Theodore R. Kruger, Granada Hills; Chris R. Manners, Moorpark; Hop D. Nguyen, Quartz Hill, all of Calif.

[73] Assignee: 3D Systems, Inc., Valencia, Calif.

[21] Appl. No.: 08/920,428

[22] Filed: Aug. 29, 1997

[51] Int. Cl.⁶ ............................. B29C 35/08; B29C 41/02
[52] U.S. Cl. ........................ 264/401; 264/308; 264/497; 364/468.27
[58] Field of Search ..................................... 264/308, 401, 264/497; 364/468.27

[56] References Cited

U.S. PATENT DOCUMENTS

| | | | |
|---|---|---|---|
| 5,209,878 | 5/1993 | Smalley et al. | 264/401 |
| 5,597,520 | 1/1997 | Smalley et al. | 264/401 |

FOREIGN PATENT DOCUMENTS

| | | |
|---|---|---|
| 388-129 | 9/1990 | European Pat. Off. . |
| 2-95830 | 4/1990 | Japan . |
| 2-95831 | 4/1990 | Japan . |

*Primary Examiner*—Leo B. Tentoni
*Attorney, Agent, or Firm*—Dennis R. Smalley; Forrest L. Collins

[57] ABSTRACT

A rapid prototyping and manufacturing (e.g. stereolithography) method and apparatus for making high resolution objects utilizing low resolution materials which are limited by their inability to reliably form coatings of a desired thickness. The formation of coatings of such materials is limited to a Minimum Recoating Depth (MRD), when formed over entirely solidified laminae, which is thicker than the desired layer thickness or object resolution. Data manipulation techniques result in layers of material (and laminae) of the object being categorized as non-consecutive primary layers (laminae) and secondary layers (laminae) positioned intermediate to the primary layers (laminae). Substantially, all portions of primary laminae are exposed in association with primary layers and portions of the secondary laminae are formed in association with their respective secondary layers while other portions of the secondary laminae are formed in association with primary layers so as to form the object with a higher resolution than that dictated by the spacing between the primary layers. Recoating techniques are described which can be used when the thickness between consecutive layers is less than a leading edge bulge phenomena that results from the use of a particular recoating device such that direction of sweeping and/or order of sweeping of the recoating device is varied between consecutive primary layers.

21 Claims, 10 Drawing Sheets

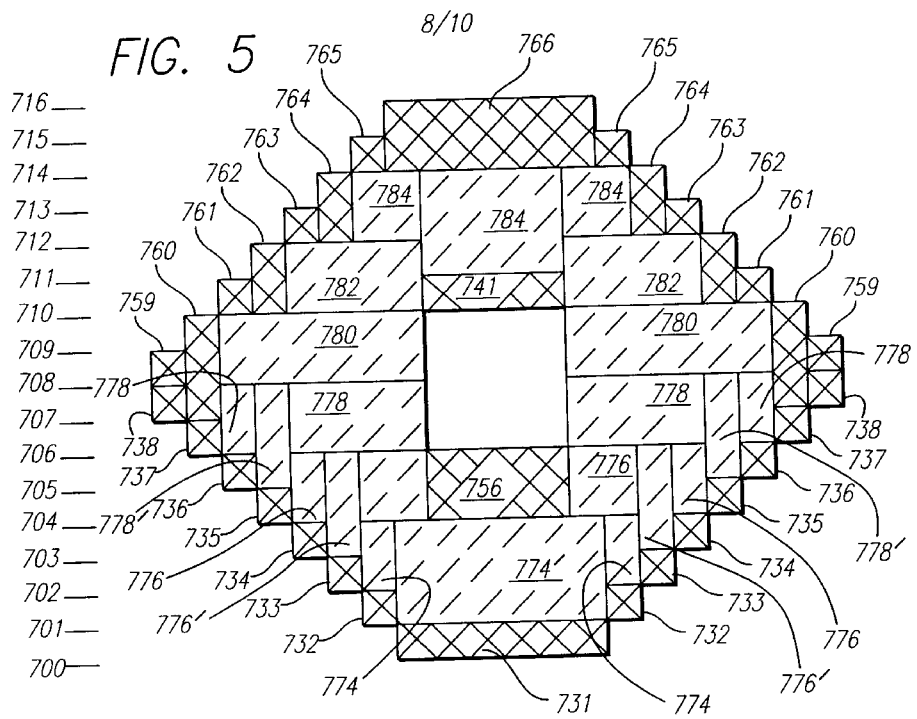
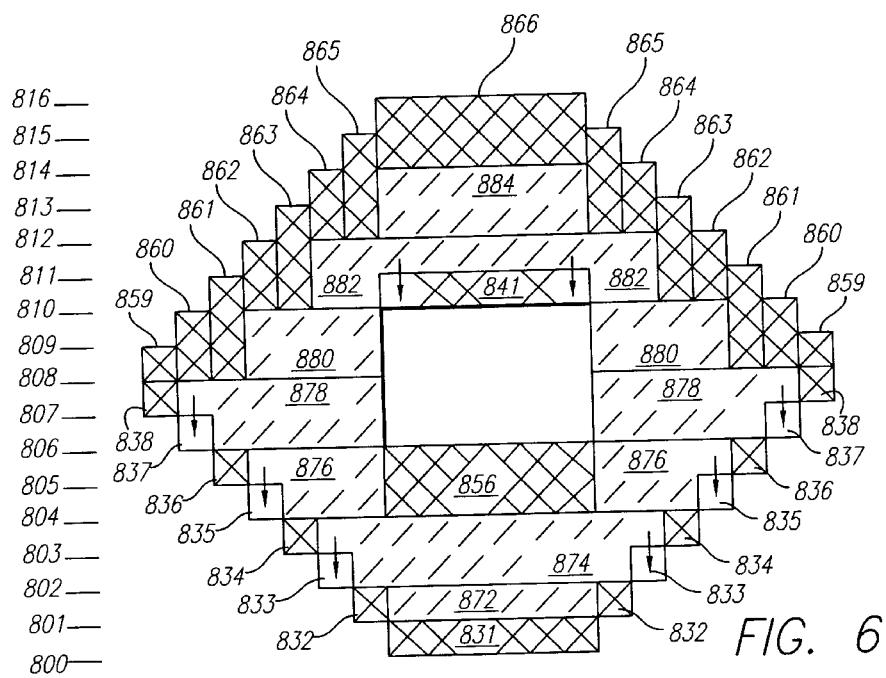

SIMPLIFIED STEREOLITHOGRAPHIC OBJECT FORMATION METHODS OF OVERCOMING MINIMUM RECOATING DEPTH LIMITATIONS

FIELD OF THE INVENTION

This invention relates to the formation of three-dimensional objects on substantially a layer-by-layer basis with enhanced resolution. The invention more particularly relates to the formation of three-dimensional objects by stereolithography utilizing techniques to overcome difficulties in recoating while maintaining acceptable or even enhanced layer resolution.

BACKGROUND OF THE INVENTION

1. Related Art

Rapid Prototypying and Manufacturing (RP&M) is the name given to a field of technologies that can be used to form three-dimensional objects rapidly and automatically from three-dimensional computer data representing the objects. RP&M can be considered to include three classes of technologies: (1) Stereolithography, (2) Selective Deposition Modeling, and (3) Laminated Object Manufacturing.

The stereolithography class of technologies create three-dimensional objects based on the successive formation of layers of a fluid-like medium adjacent to previously formed layers of medium and the selective solidification of those layers according to cross-sectional data representing successive slices of the threedimensional object in order to form and adhere laminae. One specific stereolithography technology is known simply as stereolithography and uses a liquid medium which is selectively solidified by exposing it to prescribed stimulation. The liquid medium is typically a photopolymer and the prescribed stimulation is typically visible or ultraviolet electromagnetic radiation. Liquid-based stereolithography is disclosed in various patents, applications, and publications of which a number are briefly described in the Related Applications section hereinafter. Another stereolithography technology is known as Selective Laser Sintering (SLS). SLS is based on the selective solidification of layers of a powdered medium by exposing the layers to infrared electromagnetic radiation to sinter or fuse the particles. SLS is described in U.S. Pat. No. 4,863,538 to Deckard. A third technology is known as Three Dimensional Printing (3DP). 3DP is based on the selective solidification of layers of a powdered medium which are solidified by the selective deposition of a binder thereon. 3DP is described in U.S. Pat. No. 5,204,055 to Sachs.

The present invention is primarily directed to stereolithography using liquid-based building materials (i.e. medium). The present invention presents techniques for building high resolution objects by overcoming recoating problems that can exist when using such a medium. It is believed, however, that the techniques of the present invention may have application in the other stereolithography technologies for the purposes of enhancing resolution and/or reducing distortion.

Selective Deposition Modeling, SDM, involves the build-up of three-dimensional objects by selectively depositing solidifiable material on a lamina-by-lamina basis according to cross-sectional data representing slices of the three-dimensional object.

One such technique is called Fused Deposition Modeling, FDM, and involves the extrusion of streams of heated, flowable material which solidify as they are dispensed onto the previously formed laminae of the object. FDM is described in U.S. Pat. No. 5,121,329 to Crump. Another technique is called Ballistic Particle Manufacturing, BPM, which uses a 5-axis, ink-jet dispenser to direct particles of a material onto previously solidified layers of the object. BPM is described in PCT publication numbers WO 96-12607; WO 96-12608; WO 96-12609; and WO 96-12610, all assigned to BPM Technology, Inc. A third technique is called Multijet Modeling, MJM, and involves the selective deposition of droplets of material from multiple ink jet orifices to speed the building process. MJM is described in U.S. patent application Ser. Nos. 081722,326, filed Sep. 27, 1996, and 08/722,335, filed Sep. 27, 1996, (both assigned to 3D Systems, Inc. as is the instant application). Laminated Object Manufacturing, LOM, techniques involve the formation of threedimensional objects by the stacking, adhering, and selective cutting of sheets of material, in a selected order, according to the cross-sectional data representing the three-dimensional object to be formed. LOM is described in U.S. Pat. No. 4,752,352 to Feygin; and U.S. Pat. No. 5,015,312 to Kinzie, and in PCT Publication No. WO 95-18009 to Morita.

Though, as noted above, the techniques of the instant invention are directed primarily to liquid-based stereolithography object formation, it is believed that the techniques may have application in the SDM technologies to enhance object resolution for a given droplet or stream size and/or to reduce object distortion. It is further believed that the techniques may have application in the LOM technologies to enhance object resolution when a minimum cutting depth is greater than the thickness of the individual sheets being used to form the object.

Various techniques for enhancing the resolution of three-dimensional objects formed using stereolithography have been described previously. In particular various techniques have been described in (1) U.S. Pat. No. 5,597,520 and its CIP, U.S. patent application Ser. No. 08/428,951, filed Apr. 25, 1995, both to Smalley, et. al; (2) EP Laid Open Patent Application Publication No. 388 129 to Yamamoto; (3) U.S. Pat. No. 5,209,878 to Smalley, et.al; (4) Japanese Laid Open Patent Application Publication No. 2-95830A to Nakamura et.al; and (5) Japanese Laid Open Patent Application Publication No. 2-95831A to Kuribayashi, et. al.

The '520 patent and '951 application describe the use of Simultaneous Multiple Layer Curing Techniques in Stereolithography. These techniques address issues related to the formation of objects with resolution which is finer than a Minimum Solidification Depth (hereafter "MSD") possessed by the building material. These techniques further address the formation of objects with finer resolution than a Minimum Recoating Depth (hereafter "MRD") associated with the building material. MRD may be defined as the minimum thickness of coatings that can be reliably formed over previously solidified laminae. In strict layer-by-layer object formation, the MRD sets the minimum layer thickness that can be reliably used in forming the object. To obtain a desired resolution which is finer than the MRD (i.e. layer thickness thinner than the MRD), the techniques described in this application require complex data manipulations. There is a desire in the art for simpler techniques that can enhance resolution, while relying on less complex algorithms and building techniques (e.g. ones that use simpler data handling techniques).

Yamamoto, the '129 publication, discloses the use of boundary exposures in association with alternating layers (i.e. layers N, N+2, N+4, etc.) and the use of raster exposures to solidify internal portions of laminae in association with the opposite alternating layers (i.e., N+1, N+3, N+5, etc.). According to the teachings of this reference, each pair of consecutive layers is exposed with the same shape, one exposing boundaries and the other exposing internal regions. The resolution increment for an object produced according to the teachings of this reference is equal to two layer thicknesses. The exposure of boundaries solidifies the material associated with the layer of the boundary only; while the exposure of internal regions solidifies material associated with not only the layer of exposure, but the previous layer as well. This publication does not achieve enhanced object resolution. Achieved object resolution is not based on the thickness of a single layer (i.e. thickness between consecutively applied coatings). This publication does not address the need for enhanced resolution, let alone the need for enhanced resolution in view of an MRD which is larger than desired. Furthermore, this reference fails to address any techniques for handling formation of outward facing regions that may be associated with any given lamina.

Smalley, et al., in the '878 patent, discloses the use of thick structural laminae in combination with thin fill laminae and/or meniscus smoothing to fill discontinuities at the edges of the thick structural laminae. These thin fill laminae or meniscus regions form a portion of the outward-facing, sloped regions of an object. This reference does not address recoating difficulties (e.g. MRD related issues) that may limit the ability to form the thin layers desired.

Nakamura, et al., in the '830 publication teaches a technique for reducing discontinuities between thick layers which form the interior portion of the object by forming thin fill layers in exterior regions of the object. As with the '878 patent, this publication does not address recoating difficulties (e.g. MRD related issues) that may limit the ability to form the thin layers desired.

Kuribayashi, et al., in the '831 publication teaches a technique for reducing discontinuities between thick layers by filling in these discontinuities with resin and then exposing the resin within the discontinuities to solidifying radiation. This technique leads to improved surface finish, but fails to provide a building technique that achieves enhanced object resolution when recoating difficulties exist.

All patents, applications, and publications referred to in this section are hereby incorporated by reference as if set forth in full.

A need exists in the art for simplified techniques that can be used to form objects having a desired resolution finer than that reliably allowed by the MRD of the material (i.e. the MRD associated with forming coatings over entire cross-sectional laminae).

2. Other Related Patents and Applications

The patents and applications in the following table are hereby incorporated by reference herein as if set forth in full. The gist of each patent and application is included in the table to aid the reader in finding specific types of teachings. It is not intended that the incorporation of subject matter be limited to those topics specifically indicated, but instead the incorporation is to include all subject matter found in these applications and patents. The teachings in these incorporated references can be combined with the teachings of the instant application in many ways. For example, the references directed to various data manipulation techniques may be combined with the teachings herein to derive even more useful, modified object data that can be used to more accurately and/or efficiently form objects. As another example, the various apparatus configurations disclosed in these references may be used in conjunction with the novel features of the instant invention.

TABLE 1

Related Patent and Applications

| Patent No. Application No. | Inventor | Subject |
|---|---|---|
| 4,575,330 | Hull | Discloses fundamental elements of stereolithography. |
| 4,999,143 | Hull, et al. | Discloses various removable support structures applicable to stereolithography. |
| 5,058,988 | Spence | Discloses the application of beam profiling techniques useful in stereolithography for determining cure depth and scanning velocity, etc. |
| 5,059,021 | Spence, et al. | Discloses the utilization of drift correction techniques for eliminating errors in beam positioning resulting from instabilities in the beam scanning system |
| 5,076,974 | Modrek, et al. | Discloses techniques for post processing objects formed by stereolithography. In particular exposure techniques are described that complete the solidification of the building material. Other post processing steps are also disclosed such as steps of filling in or sanding off surface discontinuities. |
| 5,104,592 | Hull | Discloses various techniques for reducing distortion, and particularly curl type distortion, in objects being formed by stereolithography. |
| 5,123,734 | Spence, et al. | Discloses techniques for calibrating a scanning system. In particular techniques for mapping from rotational mirror coordinates to planar target surface coordinates are disclosed |
| 5,133,987 | Spence, et al. | Discloses the use of a stationary mirror located on an optical path between the scanning mirrors and the target surface to fold the optical path in a stereolithography system. |
| 5,174,931 | Almquist, et al. | Discloses various doctor blade configurations for use in forming coatings of medium adjacent to previously solidified laminae. |
| 5,182,056 | Spence, et al. | Discloses the use of multiple wavelengths in the exposure of a stereolithographic medium. |
| 5,182,715 | Vorgitch, et al. | Discloses various elements of a large stereolithographic system. |
| 5,184,307 | Hull, et al. | Discloses a program called Slice and various techniques for |

TABLE 1-continued

Related Patent and Applications

| Patent No. Application No. | Inventor | Subject |
| --- | --- | --- |
| from app. no. 07/331,644, filed March 31, 1989 | | converting three-dimensional object data into data descriptive of cross-sections. Disclosed techniques include line width compensation techniques (erosion routines), and object sizing techniques. The application giving rise to this patent included a number of appendices that provide further details regarding stereolithography methods and systems. |
| 5,209,878 | Smalley, et al. | Discloses various techniques for reducing surface discontinuities between successive cross-sections resulting from a layer-by-layer building technique. Disclosed techniques include use of fill layers and meniscus smoothing. |
| 5,234,636 | Hull, et al. | Discloses techniques for reducing surface discontinuities by coating a formed object with a material, heating the material to cause it to become flowable, and allowing surface tension to smooth the coating over the object surface. |
| 5,238,639 | Vinson, et al. | Discloses a technique for minimizing curl distortion by balancing upward curl to downward curl. |
| 5,256,340 and 08/766,956, filed December 16, 1996 | Allison, et al. | Discloses various build/exposure styles for forming objects including various techniques for reducing object distortion. Disclosed techniques include: (1) building hollow, partially hollow, and solid objects, (2) achieving more uniform cure depth, (3) exposing layers as a series of separated tiles or bullets, (4) using alternate sequencing exposure patterns from layer to layer, (5) using staggered or offset vectors from layer to layer, and (6) using one or more overlapping exposure patterns per layer. |
| 5,321,622 | Snead, et al. | Discloses a computer program known as CSlice which is used to convert three-dimensional object data into cross-sectional data. Disclosed techniques include the use of various Boolean operations in stereolithography. |
| 5,597,520 and 08/428,951, filed April 25, 1995 | Smalley, et al. | Discloses various exposure techniques for enhancing object formation accuracy. Disclosed techniques address formation of high resolution objects from building materials that have a Minimum Solidification Depth greater than one layer thickness and/or a Minimum Recoating Depth greater than the desired object resolution. |
| 08/722,335, filed September 27, 1996 | Thayer, et al. | Discloses build and support styles for use in a Multi-Jet Modeling selective deposition modeling system. |
| 08/722,326, filed September 27, 1996 | Earl, et al. | Discloses data manipulation and system control techniques for use in a Multi-Jet Modeling selective deposition modeling system. |
| 08/790,005, filed January 28, 1997 | Almquist, et al. | Discloses various recoating techniques for use in stereolithography. Disclosed techniques include 1) an ink jet dispensing device, 2) a fling recoater, 3) a vacuum applicator, 4) a stream recoater, 5) a counter rotating roller recoater, and 6) a technique for deriving sweep extents. |
| 08/847,855, filed April 28, 1997 | Partanen, et al. | Discloses the application of solid-state lasers to stereolithography. |
| 08/792,347, filed January 31, 1997 | Partanen, et al. | Discloses the use of a pulsed radiation source for solidifying layers of building material and in particular the ability to limit pulse firing locations to only selected target locations on a surface of the medium. |
| 08/855,125, filed May 13, 1997 | Nguyen, et al. | Discloses techniques for interpolating originally supplied cross-sectional data descriptive of a three-dimensional object to produce modified data descriptive of the three-dimensional object including data descriptive of intermediate regions between the originally supplied cross-sections of data. |
| 08/854,950, filed May 13, 1997 | Manners, et al. | Discloses techniques for identifying features of partially formed objects. Identifiable features include trapped volumes, effective trapped volumes, and solid features of a specified size. The identified regions can be used in automatically specifying recoating parameters and or exposure parameters. |

The following two books are also incorporated by reference herein as if set forth in full: (1) *Rapid Prototyping and Manufacturing: Fundamentals of Stereolithography*, by Paul F. Jacobs; published by the Society of Manufacturing Engineers, Dearborn Mich.; 1992; and (2) *Stereolithography and other RP&M Technologies: from Rapid Prototyping to Rapid Tooling*; by Paul F. Jacobs; published by the Society of Manufacturing Engineers, Dearborn Mich.; 1996.

SUMMARY OF THE INVENTION

It is an object of the present invention to provide simplified techniques (methods and apparatus) that can be used to form objects having a desired resolution finer than that reliably allowed by the MRD of the material.

A first aspect of the invention is to provide a method of forming at least a portion of a three-dimensional object from a plurality of adhered laminae, including the steps of: (1)

forming successive layers of material adjacent to any last formed layers of material in preparation for forming subsequent laminae of the object; (2) identifying some non-consecutive layers as primary layers; (3) identifying layers intermediate to the primary layers as secondary layers; (4) exposing the material to prescribed stimulation, in association with the primary layers, to form substantially all portions of the laminae associated with the primary layers and to form portions of laminae associated with the secondary layers; and (5) exposing at least a portion of the material to prescribed stimulation, in association with the secondary layers, to form at least some outward-facing portions of the laminae associated with the secondary layers; such that the at least portion of the three-dimensional object is formed from a plurality of adhered laminae with an object resolution substantially equal to or better than the resolution defined by a thickness between successive layers.

A second aspect of the invention is to provide a method of forming at least a portion of a three-dimensional object from a plurality of adhered laminae, including the steps of: (1) forming successive layers of material adjacent to any last formed layers of material in preparation for forming subsequent laminae of the object, some of the successive layers being primary layers spaced one from the other and some being secondary layers positioned intermediate to the primary layers, wherein a spacing between successive primary layers is greater than or equal to an MRD of the material and the spacing between successive layers is less than the MRD of the material; (2) selectively exposing the primary layers to form at least majority portions of primary laminae including at least a portion of the external boundary regions of the laminae in association therewith; (3) selectively exposing the secondary layers to form at least minority portions of the secondary laminae in association therewith; (4) wherein the exposure of the primary layers and secondary layers results in adhesion of laminae to previously formed laminae so as to form the at least portion of the object from a plurality of adhered laminae with a resolution substantially equal to or better than the resolution defined by a thickness between successive layers.

A third aspect of the invention is to provide a method of forming at least a portion of a three-dimensional object from a plurality of adhered laminae, including the steps of: (1) forming successive layers of material adjacent to any last formed layers of material in preparation for forming subsequent laminae of the object; (2) identifying some nonconsecutive layers as primary layers; (3) identifying layers intermediate to the primary layers as secondary layers; (4) identifying continuing regions of the object as those regions which are neither up-facing nor down-facing; (5) identifying outward-facing-regions of the object as those regions which are either up-facing, down-facing or both; (6) exposing at least portions of material to prescribed stimulation, in association with the primary layers, to form at least portions of laminae associated with the primary layers and to form portions of laminae associated with the secondary layers; and (7) exposing at least portions of the material to prescribed stimulation, in association with the secondary layers, to form at least a portion of the outward-facing regions of the laminae associated with the secondary layers; wherein exposure of interior portions of continuing regions associated with the primary and secondary layers occurs substantially in association with only the primary layers or in association with exposure of outward-facing portions associated with the secondary layers, such that the at least portion of the three-dimensional object is formed from a plurality of adhered laminae with an object resolution substantially equal to or better than the resolution defined by a thickness between successive layers.

A fourth aspect of the invention is to provide a method of forming at least a portion of a three-dimensional object from a plurality of adhered laminae, including the steps of: (1) forming successive layers of material adjacent to any last formed layers of material in preparation for forming subsequent laminae of the object, some of the successive layers being primary layers spaced one from the other by an odd number of secondary layers positioned intermediate therebetween; (2) selectively exposing the primary layers to form at least majority portions of primary laminae in association therewith and to form at least portions of the secondary laminae; and (3) selectively exposing the secondary layers to form at least minority portions of the secondary laminae in association therewith; wherein the exposure of the primary layers and secondary layers results in adhesion of laminae to previously formed laminae so as to form the at least portion of the object from a plurality of adhered laminae; wherein the step of forming the primary layers and at least some of the secondary layers comprises the step of sweeping a recoating device at or near a surface of the material a desired number of times such that the sweeping directions and/or order of sweeping over successive primary laminae vary.

A fifth aspect of the invention is to provide a method of forming at least a portion of a three-dimensional object from a plurality of adhered laminae, including the steps of: (1) forming successive layers of material adjacent to any last formed layers of material in preparation for forming subsequent laminae of the object, some of the successive layers being primary layers spaced one from the other by an even number of secondary layers positioned intermediate therebetween; (2) selectively exposing the primary layers to form at least majority portions of primary laminae in association therewith and to form at least portions of secondary laminae; and (3) selectively exposing the secondary layers to form at least minority portions of the secondary laminae in association therewith; wherein the exposure of the primary layers and secondary layers results in adhesion of laminae to previously formed laminae so as to form the at least portion of the object from a plurality of adhered laminae; wherein the step of forming the primary and at least some of the secondary layers comprises the step of sweeping a recoating device at or near a surface of the material a desired number of times such that the sweeping directions over successive primary laminae occur in different directions or a different order of directions and wherein a different number of sweeps of the recoating device are made over at least two laminae within a group of laminae comprising a primary lamina, a next consecutive primary lamina and all secondary laminae therebetween.

A sixth aspect of the invention is to provide a method of forming at least a portion of a three-dimensional object from a plurality of adhered laminae, including the steps of: (1) identifying some non-consecutive cross-sections as primary cross-sections; (2) identifying cross-sections intermediate to the primary cross-sections as secondary cross-sections; (3) forming, in association with the primary cross-sections, substantially all portions of laminae associated with the primary cross-sections and forming portions of laminae associated with secondary cross-sections; and (4) forming, in association with the secondary cross-sections, at least some outward-facing portions of the laminae associated with the secondary cross-sections including at least some of any flat up-facing or flat down-facing regions; such that the at least portion of the three-dimensional object is formed from a plurality of adhered laminae with an object resolution substantially equal to or better than the resolution defined by a thickness between successive layers.

Other aspects of the invention supply apparatus for implementing the method aspects of the invention noted above.

Additional aspects of the invention will be clear from the embodiments of the invention described below in conjunction with the Figures associated therewith. Further aspects of the invention involve the practice of the above referred to aspects of the invention in combination with one another.

BRIEF DESCRIPTION OF DRAWINGS

FIG. 3b depicts a side view of the object of FIG. 2a formed using the first embodiment of the instant invention where the MRD is two layer thickness resulting in pairs of non-consecutive primary layers being separated by single intermediate secondary layers and wherein the primary layers are shifted by one layer thickness as compared to their locations in FIG. 3a.

FIG. 5 depicts a side view of the same object as depicted in FIG. 2a as formed according to the teachings of the second embodiment of the instant invention where the MRD is two layer thicknesses and the MSD is one layer thickness.

FIG. 6 depicts a side view of the same object as depicted in FIG. 2a as formed according to the teachings of the third embodiment of the instant invention where the MRD is two layer thicknesses and the MSD is one layer thickness.

DESCRIPTION OF PREFERRED EMBODIMENTS OF THE INVENTION

Introduction

Figure 1A:
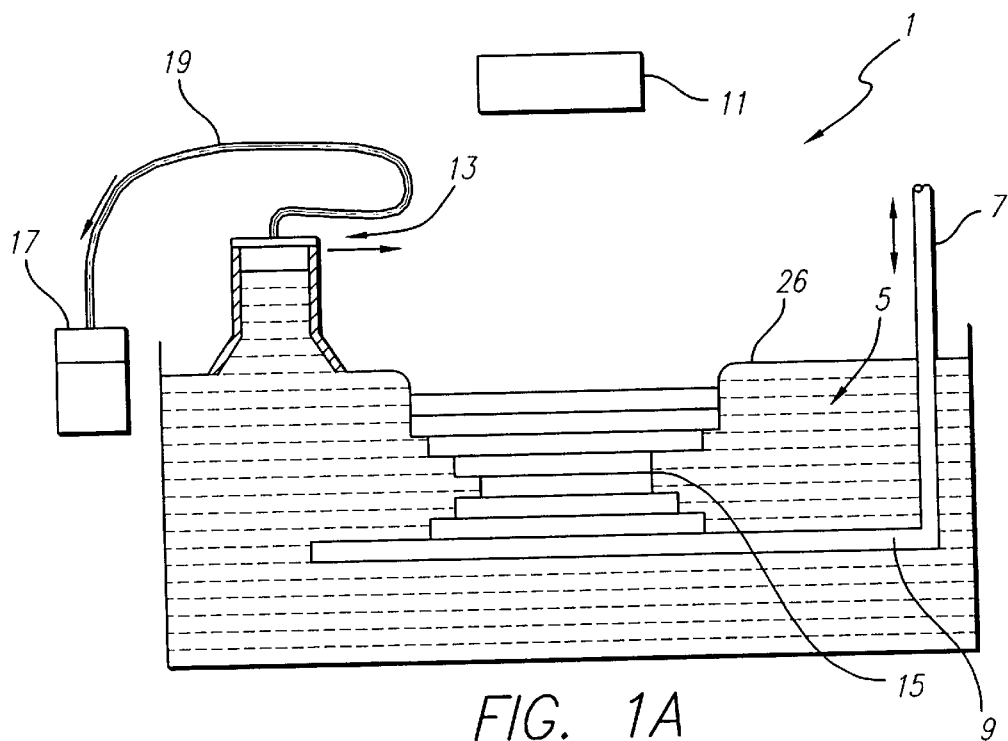
FIGS. 1a and 1b depict side views of a stereolithography apparatus for practicing the instant invention.
Figure 1B:
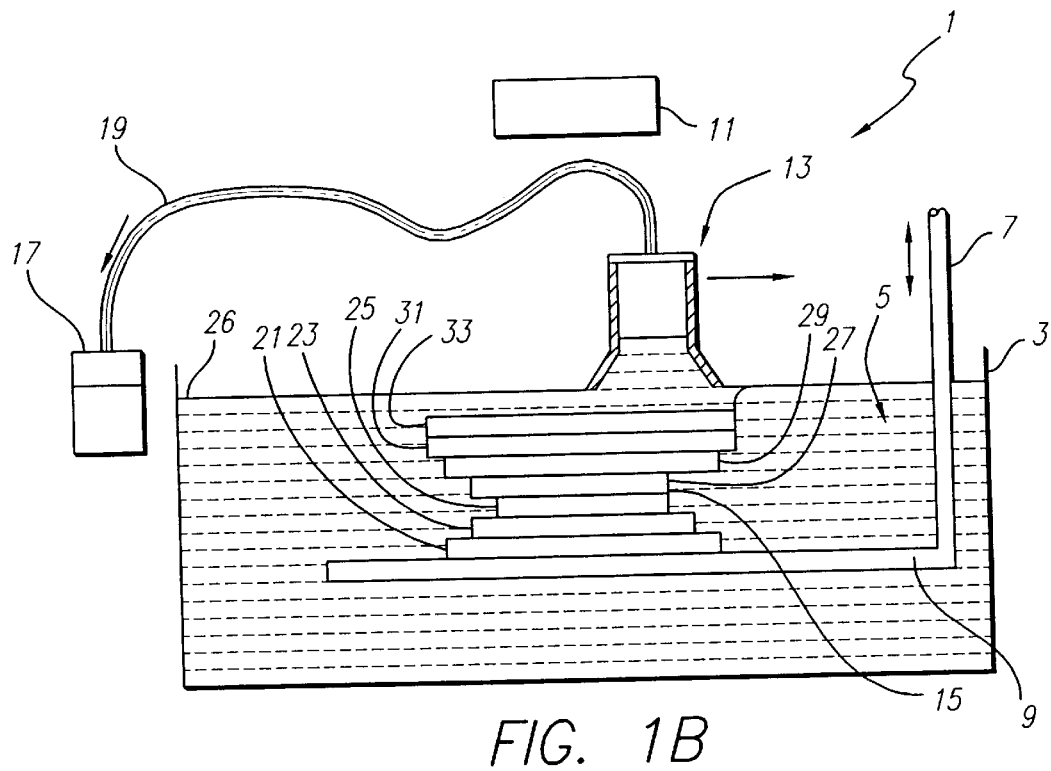

FIG. 1a and 1b depict schematic representations of a preferred stereolithography apparatus 1 (SLA) for use with the instant invention. The basic components of an SLA are described in U.S. Pat. Nos. 4,575,330; 5,184,307; and 5,182,715 as referenced above. The preferred SLA includes container 3 for holding building material 5 (e.g. photopolymer) from which object 15 will be formed, elevator 7 and driving means (not shown), elevator platform 9, exposure system 11, recoating bar 13 and driving means (not shown), at least one computer for manipulating object data (as needed) and for controlling the exposure system, elevator, and recoating devices.

A preferred scanning system is described in several of the patents and applications referenced above including U.S. Pat. Nos. 5,058,988; 5,059,021; 5,123,734; 5,133,987; and 08/792,347, filed Jan. 31, 1997. This preferred system includes the use of a laser, beam expander, and a pair of computer controlled XY rotatable scanning mirrors of either the motor driven or galvanometer type.

Preferred control and data manipulation systems and software are described in a number of the patents referenced above, including U.S. Pat. Nos. 5,184,307; 5,321,622; and 5,597,520.

A preferred recoating device is described in U.S. patent application Ser. No. 08/790,005, filed Jan. 28, 1997, as referenced above and includes recoater bar 13, regulated vacuum pump 17, and vacuum line 19 connecting the bar 13 and the pump 17.

Other components (not shown) of a preferred SLA may include a liquid level control system, a build chamber, an environmental control system including a temperature control system, safety interlocks, a viewing device, and the like.

SLAs on which the instant invention can be utilized are available from 3D Systems, Inc. of Valencia, Calif. These SLAs include the SLA-250 using a HeCd laser operating at 325 nm, the SLA-350 using a solid state laser operating at 355 nm, and the SLA-500 using an $Ar^+$ laser operating at 351 nm. Preferred building materials are photopolymers manufactured by CIBA Specialty Chemicals of Los Angeles, Calif., and are available from 3D Systems, Inc. These materials include SL 5170 for use with the SLA-250, SL 5190 for use with the SLA-350, and SL 5180 for use with the SLA-500.

The typical operation of an SLA involves alternating formation of coatings of material (i.e. layers of material) and the selective solidification of those coatings to form an object from a plurality of adhered laminae. The process begins with the elevator platform 9 immersed one layer thickness below the upper surface 26 of the photopolymer 5. The coating of photopolymer is selectively exposed to a beam of prescribed stimulation (e.g. UV radiation) which cures the material to a desired depth to form an initial lamina of the object adhered to the elevator platform. This initial lamina corresponds to an initial cross-section of the object to be formed or corresponds to supports which may be used to adhere the object to the platform. After formation of this initial lamina, the elevator platform and adhered initial lamina are lowered a net amount of one layer thickness into the material. Hereinafter, layer thickness and other units of distance may be expressed in any of three units: (1) inches, (2) milli-inches (i.e. mils), or (3) millimeters. As the material is typically very viscous and the thickness of each layer is very thin (e.g. 4 mils to 10 mils), the material may not readily form a coating over the last solidified lamina. In the case where a coating is not readily formed, a recoating device may be swept at or somewhat above the surface of the resin (i.e. work surface of the material) to aid in the formation of a fresh coating. The coating formation process may involve the sweeping of the recoating bar one or more times at a desired velocity. After formation of this coating, the layer is solidified by a second exposure of the medium to prescribed stimulation according to data representing a second cross-section of the object. This process of coating formation and solidification is repeated over and over again until the object is formed from a plurality of adhered layers (21, 23, 25, 27, 29, 31, and 33).

In some building techniques, incomplete solidification of some or all object cross-sections may occur. Alternatively, in some processes an object lamina associated with a given layer (i.e. a lamina whose location should be positioned, relative to the rest of the object, at the level corresponding to that layer of material) may not be exposed or may be only partially exposed in association with that layer (i.e. when that layer is located at the surface of the liquid). Instead, that lamina may be formed in whole or in part in association with a subsequently formed layer wherein the exposure applied to this subsequent layer is such as to cause material transformation to such an extent as to cause solidification in the material at the level of the associated cross-section. In other words, the layer which is associated with a given lamina may not be the layer "in association with" which the lamina will be solidified. It may be said that the layer "in association with" which a lamina or portion of a lamina is formed, is that layer which is located at the surface of material at the time it is solidified; while the layer with which a lamina "associated," is that layer which corresponds to the dimensionally correct location of the lamina relative to the rest of the object.

As noted above, the instant invention provides a simplified technique for producing objects with higher resolution than typically thought possible using a building material that has a minimum recoating depth (MRD) which is greater than the resolution desired (i.e. typically layer thickness). In this context, MRD may be considered the depth of coating that must be formed in order to form reliable or timely coatings of material over completely solidified laminae or cross-sections of the object. If only portions of the cross-sections are formed, it may be possible to form reasonably reliable coatings having thicknesses less than the MRD. Preferred embodiments of the instant invention are based on the recognition and exploitation of this phenomena.

Furthermore, the preferred embodiments of the instant invention achieve simplified data processing by utilizing predefined layer levels (e.g. vertical levels when layers are formed horizontally) for implementing variations in build parameters that will be used in forming the objects. These predefined levels may be: (1) independent of object location (e.g. vertical location), (2) based on the location of the first layer of the object, or (3) based on the location of a particular vertical location of an object feature.

Figure 2A:
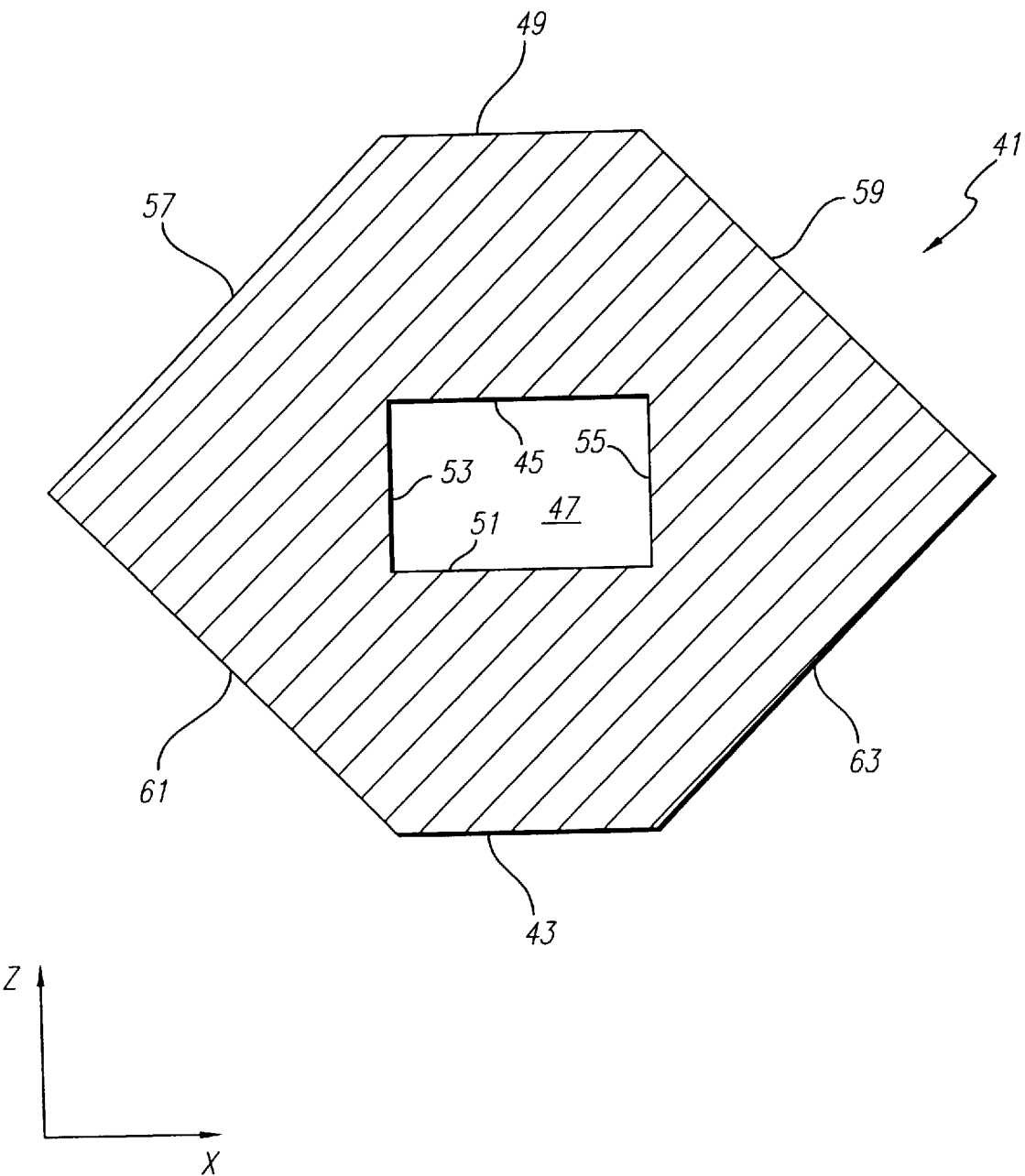
FIG. 2a depicts a side view of an object to be formed using stereolithography

FIG. 2a depicts a side view of an object 41 to be produced stereolithographically. In terms of forming horizontal layers, this figure depicts the vertical axis (Z) and one of the horizontal axes (X). This object will be used throughout the description of preferred embodiments of the instant invention to illustrate various features associated with those embodiments. This object will also be used to illustrate some typical aspects associated with standard stereolithographic practice which will be helpful in understanding the instant invention and its embodiments. This object includes two horizontal (i.e. flat) down-facing features: one at the bottom 43 of the object and the other at the upper edge 45 of the hole 47 through the middle of the object. Similarly, this object includes two horizontal (i.e. flat) up-facing features: one at the top 49 of the object and the other at the lower edge 51 of the hole 47 through the middle of the object. This object includes two vertical walls 53 and 55 located on either side of hole 47. This object also includes two non-horizontal (sometimes called, "near flat") up-facing regions 57 and 59 located on either side of the object and two non-horizontal down-facing regions 61 and 63 located on either side of the object.

Figure 2B:
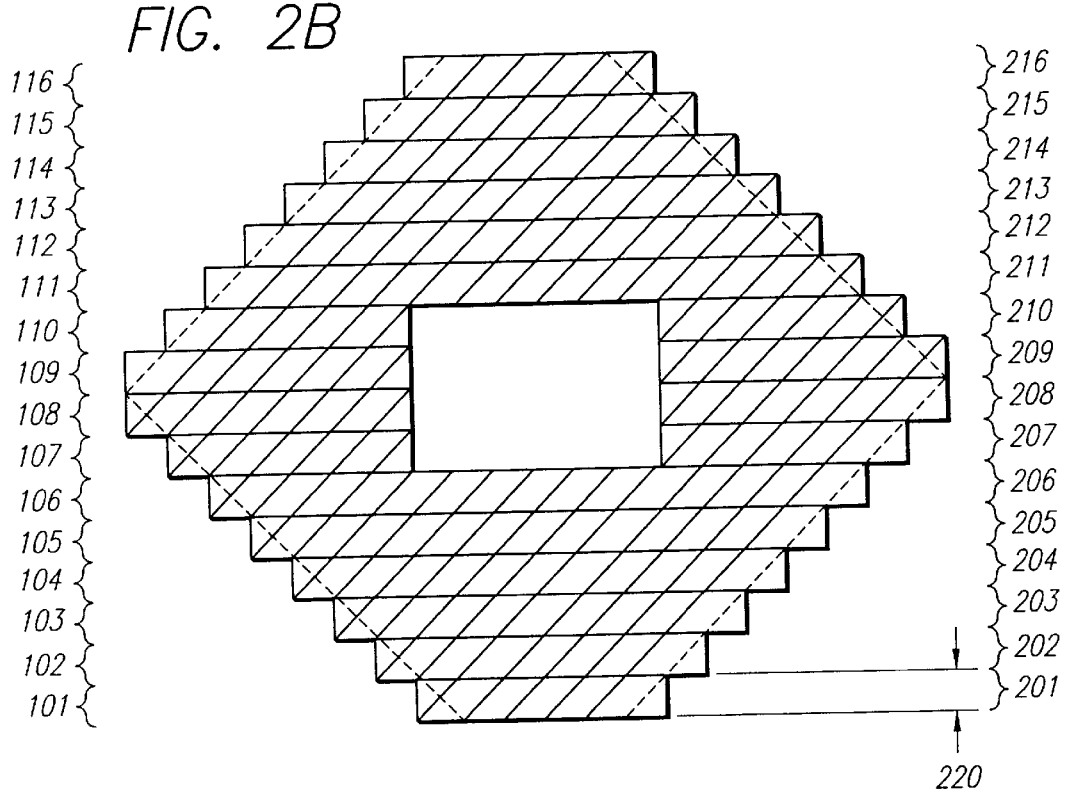
FIG. 2b depicts a side view of the object of FIG. 2a formed using a strict layer-by-layer build up technique.

FIG. 2b illustrates the object as it might be formed with a desired resolution using stereolithography wherein the MSD and MRD (both discussed briefly above and further in U.S. Pat. No. 5,597,520) of the material are both less than or equal to the desired layer thickness. Hereafter, MSD and MRD are typically referred to in layer increments as associated with rounding-up their thicknesses to the nearest layer level. In this example, the thickness 220 of each layer is the same as that for the other layers. As indicated, the object is formed from 16 adhered laminae 101–116 and 16 associated layers of material 201–216. The upper surface of each lamina is depicted with a solid horizontal line which indicates that each lamina was completely formed from a single coating or layer of material. Thus, in this case not only is each lamina 101–116 associated with a corresponding layer 201–216, respectively, each lamina 101–116 was formed in association with its corresponding layer 201–216, respectively. As layers are typically solidified from their upper surface downward, it is typical to associate cross-sectional data, lamina and layer designations with the upper extent of their positions. To ensure adhesion between laminae, at least portions of each lamina are typically provided with a quantity of exposure that yields a cure depth of more than one layer thickness. To optimize accuracy it is typically desired that down-facing regions not be given extra exposure as there is nothing below them on which to adhere.

A comparison of FIG. 2a and 2b indicates that the object as reproduced in this example is oversized relative to its original design. Vertical and horizontal features are positioned correctly; but those features which are sloped or near flat (neither horizontal nor vertical), have solidified layers whose minimal extent touches the envelope of the original design and whose maximum extent protrudes beyond the original design. Further discussion of data association, exposure, and sizing issues can be found in U.S. Pat. Nos. 5,184,307 and 5,321,622 as well as a number of other patents referenced above.

Figure 2C:
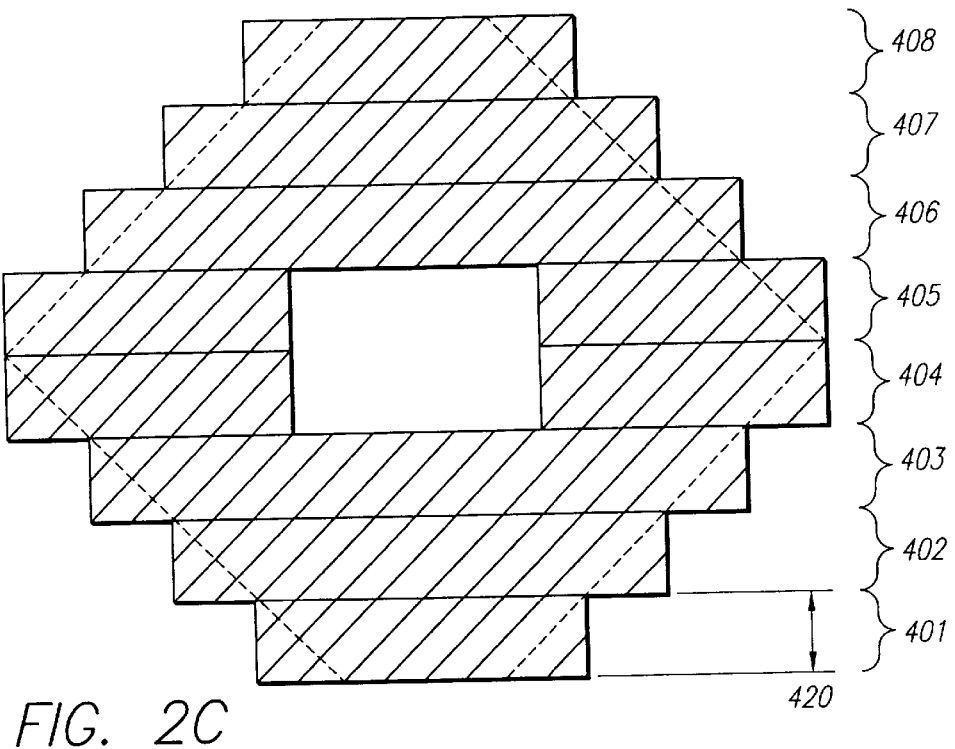
FIG. 2c depicts a side view of the object of FIG. 2a formed using a strict layer-by-layer build up technique where the layer thickness is twice that as depicted in FIG. 2b.

FIG. 2c depicts the object of FIG. 2a as formed using stereolithography with a layer thickness 420 which is twice that depicted in FIG. 2b. Since the layer thickness is twice as large, the resolution is twice as course (or half as fine). The object is formed from eight laminae 301–308 and eight layers 401–408. As the upper portion of each lamina is depicted as being completely bordered by a horizontal line, each individual lamina (ignoring extra exposure that may be associated with adhering the laminae together) is formed from an individual layer of material. That is, laminae 301–308 are associated with layers 401–408, respectively, and are formed in association with layers 401–408, respectively.

Depending on the MRD of the material used in forming the object of FIG. 2c, the object may not be reproducible with a finer resolution than that depicted. If the MRD was larger than layer thickness 220 (FIG. 2b), it would not be possible to reproduce this object with the resolution as depicted in FIG. 2b. However, according to the teachings of the instant application, such reproduction would be possible as the proposed building techniques deviate from the strict formation of each complete lamina in association with the layer with which it is associated. Furthermore, the preferred embodiments provide simplified techniques for accommodating an MRD which is greater than the desired resolution than those taught in U.S. Pat. No. 5,597,520.

Figure 2D:
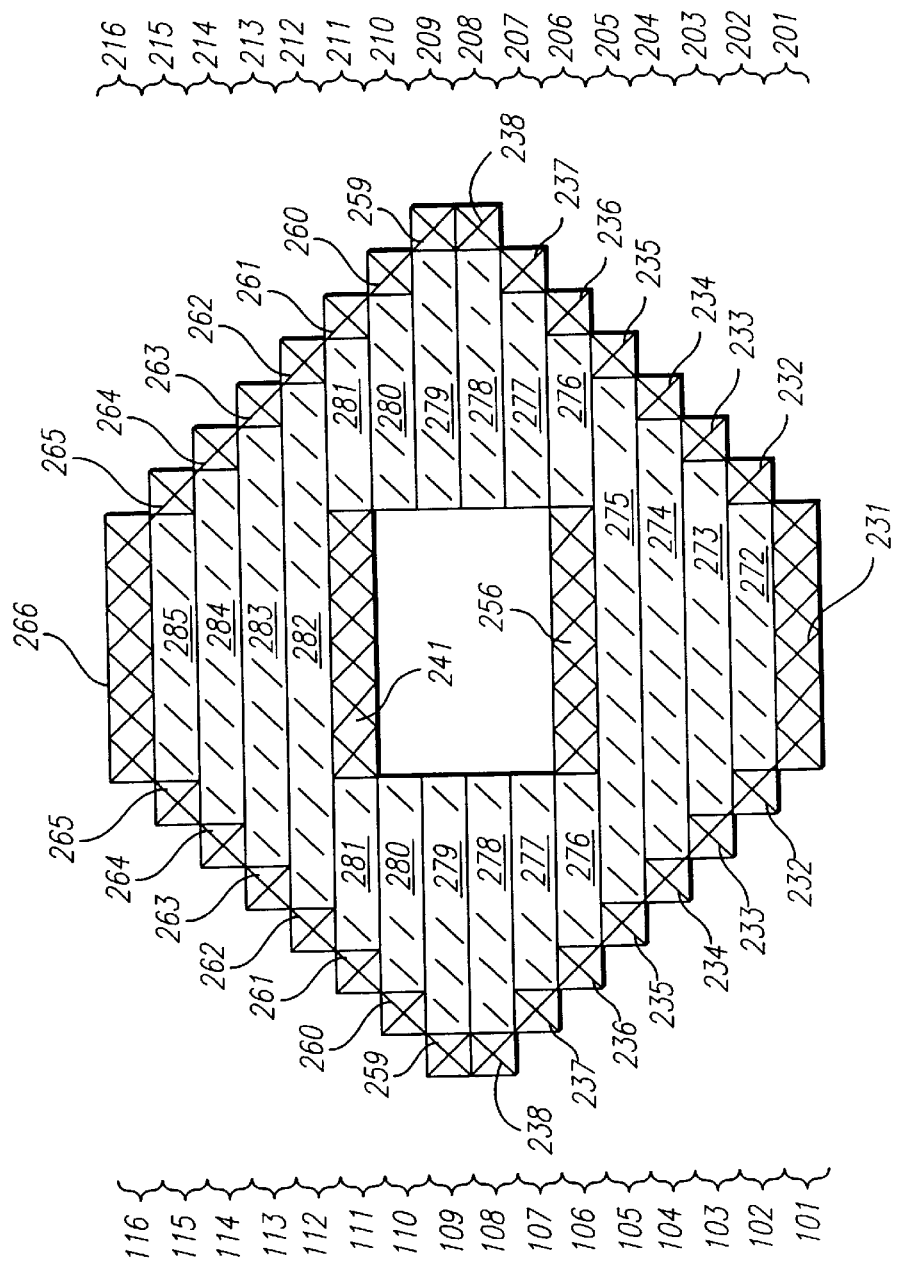
FIG. 2d depicts a side view of the object of FIG. 2b where the different exposure regions associated with each layer are depicted.

FIG. 2d depicts the object as produced in FIG. 2b but with various regions of the object and object laminae highlighted. In one classification scheme (as described in U.S. Pat. No. 5,321,622) each lamina of the object can contain one, two or three different regions: (1) down-facing regions; (2) up-facing regions, and (3) continuing regions (i.e. regions that are neither down-facing nor up-facing). In this scheme, the following eight vector types might be utilized though others may be defined and used:

| | |
|---|---|
| Down-facing boundaries | Boundaries that surround down-facing regions of the object. |
| Up-facing boundaries | Boundaries that surround up-facing regions of the object. |
| Continuing boundaries | Boundaries that surround regions of the object that are neither up-facing nor down-facing |
| Down-facing Hatch | Lines of exposure that are positioned within the down-facing boundaries. These lines may be closely or widely spaced from one another and they may extend in one or more directions. |
| Up-facing Hatch | Lines of exposure that are positioned within the up-facing boundaries. These lines may be closely or widely spaced from one another and they may extend in one or more directions. |
| Continuing Hatch | Lines of exposure that are positioned within continuing boundaries. These lines may be closely or widely spaced from one another and they may extend in one or more directions. |
| Down-facing Skin | Lines of exposure which are positioned within the down-facing boundaries and closely spaced so as to form a continuous region of solidified material. |
| Up-facing Skin | Lines of exposure which are positioned within the up-facing boundaries and closely spaced so as to form a continuous region of solidified material. |

Taken together, the down-facing boundaries, hatch and fill define the down-facing regions of the object. The up-facing boundaries, Lip-facing hatch, and up-facing fill, define the up-facing regions of the object. The continuing boundaries and continuing hatch define the continuing regions of the object. As down-facing regions have nothing below them to which adhesion is desirably achieved (other than maybe supports), the quantity of exposure applied to these regions typically does not include an extra amount to cause adhesion to a lower lamina though extra exposure might be given to appropriately deal with any MSD issues that exist. As up-facing and continuing regions have solidified material located below them, the quantity of exposure applied to these regions typically includes an extra amount to ensure adhesion to a lower lamina.

Table 2 outlines the different regions found on each lamina for FIG. 2d.

TABLE 2

Object Regions Existing on Each Lamina of FIG. 2d

| Lamina & Layer | Down-Facing Region(s) | Up-Facing Region(s) | Continuing Region(s) |
|---|---|---|---|
| 101, 201 | 231 | | |
| 102, 202 | 232 | | 272 |
| 103, 203 | 233 | | 273 |
| 104, 204 | 234 | | 274 |
| 105, 205 | 235 | | 275 |
| 106, 206 | 236 | 256 | 276 |
| 107, 207 | 237 | | 277 |
| 108, 208 | 238 | | 278 |
| 109, 209 | | 259 | 279 |
| 110, 210 | | 260 | 280 |
| 111, 211 | 241 | 261 | 281 |
| 112, 212 | | 262 | 282 |
| 113, 213 | | 263 | 283 |
| 114, 214 | | 264 | 284 |
| 115, 215 | | 265 | 285 |
| 116, 216 | | 266 | |

Other schemes for region identification and vector type creation are described in various patents and applications referenced above, including U.S. Pat. Nos. 5,184,307; 5,209,878; 5,238,639; 5,597,520; and, U.S. application Ser. No. 08/722,326, filed May 13, 1997, and application Ser. No. 08/855,125, filed Sep. 27, 1996. Some schemes might involve the use of fewer designations such as: (1) defining only outward facing regions and continuing regions where down-facing and up-facing regions are combined to form the outward facing regions; (2) combining all fill types into a single designation; or (3) combining up-facing and continuing hatch into a single designation or even all three hatch types into a single designations. Other schemes might involve the use of more designations such as dividing one or both of the up-facing and down-facing regions into flat regions and near-flat regions.

Other region identifications might involve the identification of which portions of boundaries regions associated with each lamina are outward facing and/or interior to the lamina. Outward facing boundary regions are associated with the Initial Cross-Section Boundaries (i.e. the cross-sectional boundary regions existing prior to dividing them into down-facing, up-facing, and continuing boundary regions) described in U.S. Pat. Nos. 5,321,622 and 5,597,520. Interior boundaries are bounded on both sides by object portions of the lamina whereas outward boundaries are bounded on one side by an object portion of the lamina and on the other side by a non-object portion of the lamina.

Figure 2E:
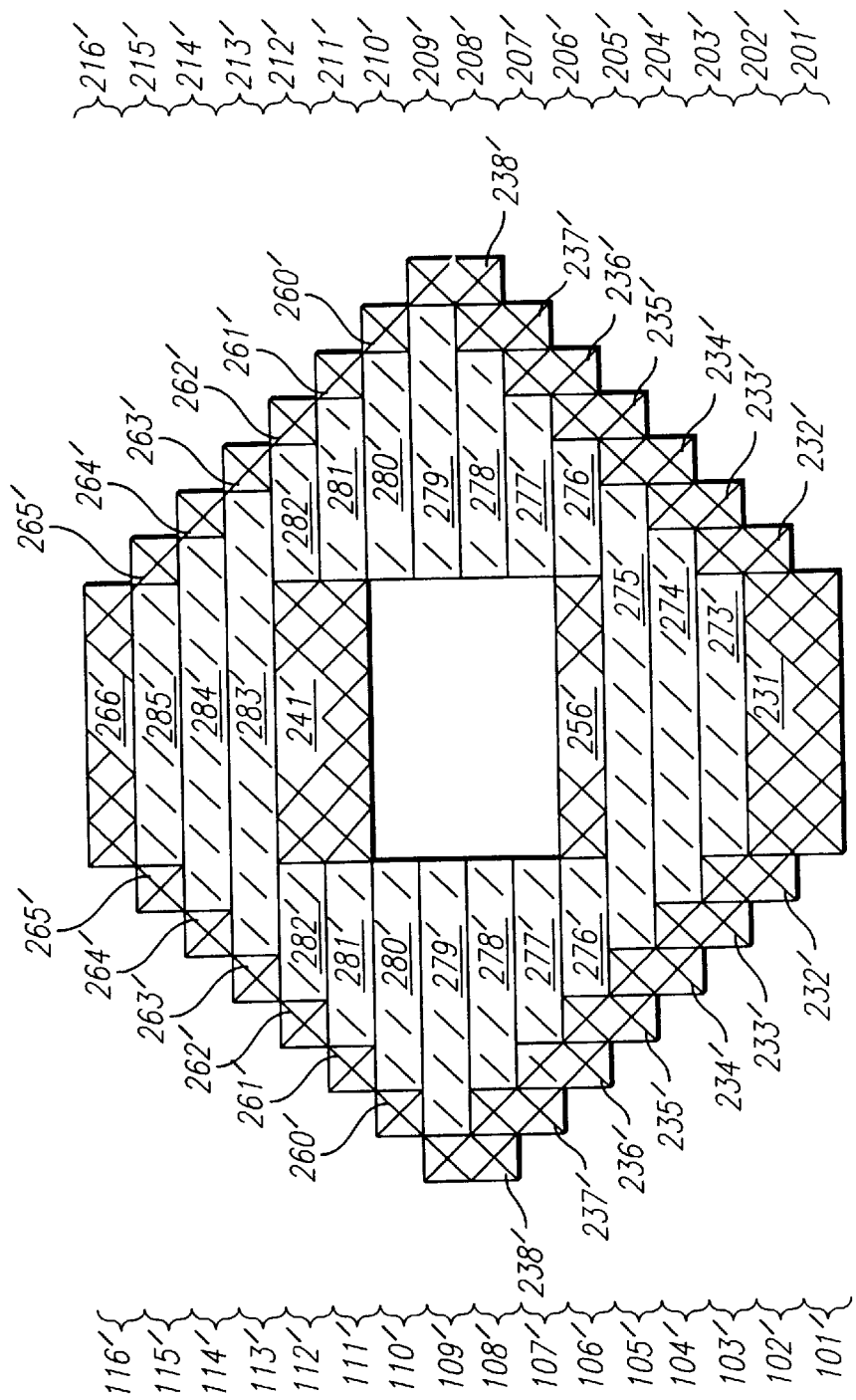
FIG. 2e depicts a side view of the object of FIG. 2b where the different exposure regions associated with each layer are depicted and wherein the data has been modified to accommodate for a two-layer MSD.

The starting point for implementation of the instant invention need not be the data associated with a strict layer-by-layer building process as illustrated in FIGS. 2b, 2c, and 2d. The starting point may be initial or modified three-dimensional object data that has not yet been converted to cross-sectional data. Furthermore, it may be modified cross-sectional data descriptive of laminae that will not be formed on a strict layer-by-layer basis. For example, the starting point may be surface or cross-sectional data that has been modified to accommodate for an MSD which is greater than one layer thickness. In this regard, FIG. 2e depicts an object formed using the teaching of U.S. Pat. No. 5,597,520 wherein the MSD of the material is equal to twice the desired layer thickness. This technique of forming objects where the MSD is greater than the desired layer thickness can be combined with the teachings of the instant invention to form objects of high resolution. An object may be formed with high resolution by pushing the down-facing features associated with initial laminae up into higher laminae (in the example of FIG. 2e, an upward shift of 1 layer thickness is utilized) and removing initial cross-sectional data associated with the layers to which the down-facing regions have been shifted. Since all down-facing regions must be solidified to a depth of two layer thicknesses, each is pushed up from its originally associated layer and lamina so that it is associated with both its original lamina and layer as well as the next higher lamina and layer and so that it is formed in association with the next higher lamina. Table 3 outlines this transformation process:

TABLE 3

Transformation of Layer Data to Accommodate an MSD of Two Layer Thicknesses

| Down-Facing Feature | Initial Lamina & Layer | Associated Laminae and Layers | Layer Association for Exposure |
|---|---|---|---|
| 231' | 101', 201' | 102', 202' 101', 201' | 202' |
| 232' | 102', 202' | 103', 203' 102', 202' | 203' |
| 233' | 103', 203' | 104', 204' 103', 203' | 204' |
| 234' | 104', 204' | 105', 205' 104', 204' | 205' |
| 235' | 105', 205' | 106', 206' 105', 205' | 206' |
| 236' | 106', 206' | 107', 207' 106', 206' | 207' |
| 237' | 107', 207' | 108', 208' 107', 207' | 208' |
| 238' | 108', 208' | 109', 209' 108', 208' | 209' |
| 241' | 111', 211' | 112', 212' 111', 211' | 212' |

We next turn our attention to specific preferred embodiments of the instant invention which will be described in view of the preliminary information and background provided above. The headers associated with the following embodiments are intended to aid reading this disclosure but are not intended to isolate or limit the applicability of the teachings herein to those individual embodiments in connection with which explicit disclosure is made.

The First Embodiment

The first preferred embodiment of the instant invention involves identifying some non-consecutive layers of medium, or non-consecutive cross-sections of data, as primary layers. Of course, the identification of these layers as primary layers is simply done in order to aid in the concise description of the technique and should not be considered as relevant beyond that. These identified non-consecutive layers, or primary layers, have some common attributes that will be associated with object formation. These primary layers are spaced from one another by one or more intermediate layers which are identified as secondary layers.

Other designations or identifications of cross-sections or layers are possible and equally fall within the bounds of the invention so long as object formation techniques associated with these cross-sections or layers are the same or an equivalent thereof. For example, instead of using two designations to identify layers, three or more modified designations may be used where one or more such designations may have attributes associated with primary layers and one or more may have attributes associated with the secondary layers. If two or more modified designations are associated with the secondary or primary layers, each of these designations may have somewhat different exposure parameters or recoating parameters associated therewith.

Cross-sectional exposure is modified according to the following guidelines. This process may be implemented via a modification of the initial cross-sectional data associated with the layers whereafter, the modified data is used in the formation of the three-dimensional object. It is assumed that the up-facing surfaces of the primary layers are spaced one from the other by N layer thicknesses (i.e. the MRD is N layer thicknesses). For convenience hereafter, this separation may simply be indicated by stating that the primary layers are separated by N layer thicknesses. Exposure modifications associated with this embodiment are indicated in the Table below:

TABLE 4

Embodiment No. 1: Exposure Modification (For an MRD = N layer thicknesses)

| Data Type(s) | How to Handle |
|---|---|
| Down-facing Boundaries and Fill | Expose in association with the original layer with which they were associated and apply appropriate exposure as would have been done without consideration of any modification for handling the MRD. |
| Up-Facing Boundaries and Fill | Expose in association with the original layer with which they were associated and apply an exposure appropriate to obtain solidification to a depth of N layer thicknesses plus any extra exposure desired to ensure adhesion. |
| Continuing Boundaries | Expose in association with the original layer with which they were associated and apply an exposure appropriate to obtain solidification to a depth of N layer thicknesses plus any extra exposure desired to ensure adhesion. |
| Continuing, Down-Facing, and Up-Facing Hatch | Expose hatch associated with the primary layers and do not expose hatch associated with the secondary layers and apply an exposure appropriate to obtain solidification to a depth of N layer thicknesses plus any extra exposure desired to ensure adhesion. |

As noted above, these exposure modifications may be implemented by removing data and associating appropriate exposure parameters with the remaining data. This embodiment does a good job of increasing the number of layers and regions on those layers so that they are exposed only when they have attained a coating depth equal to the MRD, which is assumed to be N-layer thicknesses, while avoiding the necessity of doing any time consuming Boolean-type comparison operations on the layer data. Depending on the particular object configuration, MRD, etc., some layers may not have any exposure required in association therewith. In such a case, specific formation of a coating for that layer may be skipped in preference for directly coating to produce a subsequent layer of combined thickness. The disadvantages of this approach include: (1) excess solidification may be applied to certain locations since it is assumed that an N-layer thickness coating exists when in fact it may not exist in certain regions, and (2) due to the existence of exposure when coating may be thinner than the MRD, incomplete or inappropriately formed coating may result in errors upon exposure. It is believed that since only portions of layers are exposed in regions where the coating thickness might be less than the MRD, the risks of having coating problems that impact object formation are dramatically reduced as compared to situations where coatings thinner than the MRD are attempted over entire laminae and then exposed. In other words, the effective MRD is reduced as a result of only partially forming some laminae.

Figure 3A:
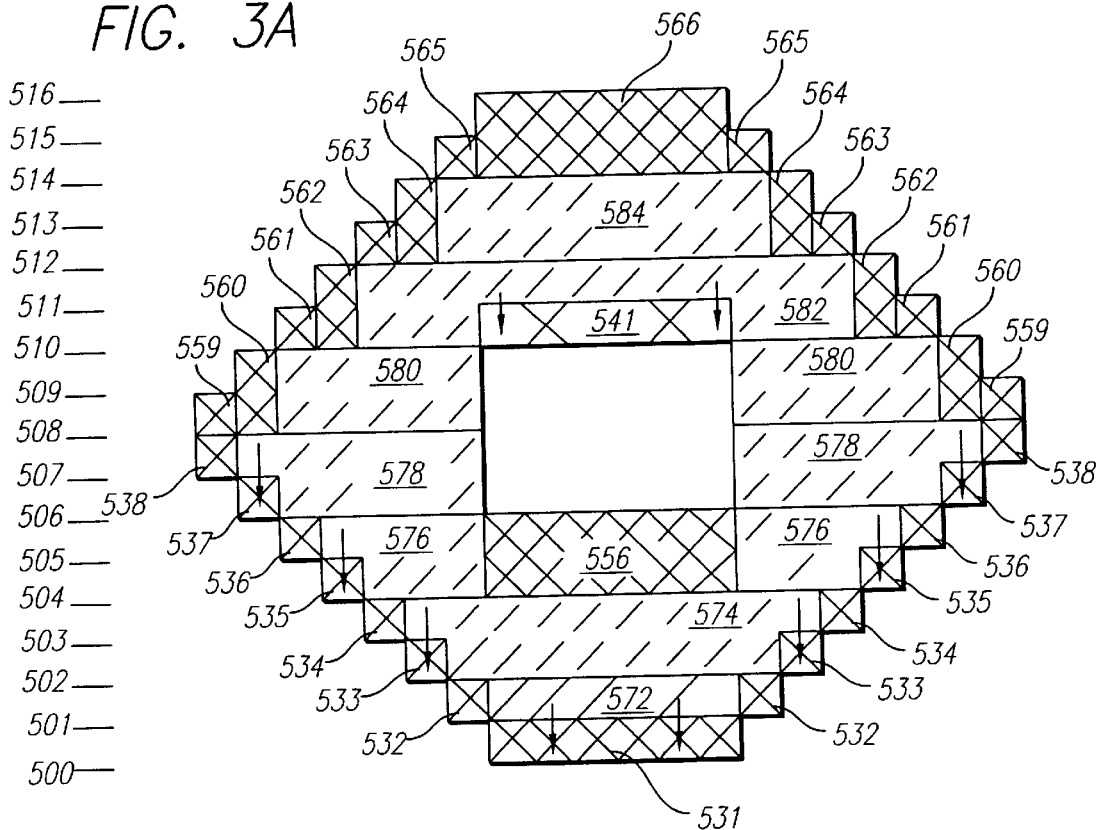
FIG. 3a depicts a side view of the object of FIG. 2a formed using the first embodiment of the instant invention where the MRD is two layer thickness resulting in pairs of non-consecutive primary layers being separated by single intermediate secondary layers.

FIG. 3a depicts an example of this first embodiment as applied to the object of FIG. 2a. In this example the MRD is considered to be twice the desired layer thickness (i.e. more than one layer thickness and less than or equal to two layer thicknesses) where the desired layer thickness equals that used in FIG. 2b. In other words, it is desired to form an object with the resolution of FIG. 2b where the MRD of the material is that which could typically only produce an object with the resolution as depicted in FIG. 2c. Primary layers 500, 502, 504, 506, 508, 510, 512, 514, and 516 are depicted as being separated by secondary layers 501, 503, 505, 507, 509, 511, 513, and 515. In this Figure, the reference numerals associated with each layer are depicted at the level associated with the upper extent of each layer. In this figure, boundary types existing on each layer, whether of the down-facing, up-facing, or continuing types, are exposed in association with this associated layer even though delays in exposing continuing hatch regions exist in this embodiment. Since the data utilized in the instant embodiment is associated with the upper extent of each layer, no data exists at layer 500 and thus nothing is exposed in association with that layer.

At layer 501, down-facing region 531 data exists and according to the present embodiment it is exposed in association with layer 501. In this figure, it is assumed that the down-facing region 501 can be solidified to a depth equal to one layer thickness. If this were not the case, the lower extent of the object would extend below the upper level of layer 500.

At layer 502, left and right down-facing regions 532 exist and continuing data at 572 exists. Since down-facing regions are exposed in association with the layers at which they are found, regions 532 are exposed in association with layer 502. As with region 531, it is assumed that regions 532 are exposed with a quantity of prescribed stimulation appropriate to cure material to a depth of one layer thickness. Since layer 502 is one of the non-consecutive primary layers, continuing region 572 is solidified in association with this layer. As comparison operations have not been performed, it is unsure what coating depth is associated with this region. As the coating depth could be as much as two layer thicknesses (it is hoped that most of it is at this depth since the MRD of the material is assumed to be two layer thicknesses), region 572 is given sufficient exposure to cure it to a depth of two layer thicknesses plus some additional amount appropriate for ensuring adhesion. It can be seen in this case, that such a large exposure was unneeded as the coating depth was actually only one layer thickness; however, if comparison techniques are not used to verify coating depth, it is better to error on the side of too much exposure than too little. As it was assumed that the MSD was only one layer thickness, it can be further seen that the exposure of region 572 will result in excess solidification that will cause the lower limit of the object to extend beyond its desired level. Though this extension results in an object distortion, it may be considered less of a problem than the distortions that would result from the use of thicker layers as illustrated in FIG. 2c. Furthermore, in actual practice the MSD is typically larger than the MRD. Building techniques using MSD and MRD corrections are most preferred.

At layer 503, right and left side down-facing regions 533 exist and will be exposed in association with the exception of down-facing hatch this layer. Initially, a continuing region comprising both boundaries and hatch existed in association with this layer. However, since this is not one of the primary layers, the hatch portion of the continuing region (i.e. the internal portion of the continuing region) will not be exposed in association with this layer. The continuing boundaries, however, will be exposed in association with this layer.

At layer 504, left and right down-facing regions 534 exist and will be exposed in association with this layer. Additionally, since this is one of the primary layers, continuing region 574 occupying portions of both layers 503 and 504 will be exposed. As can be seen from the figure, most of region 574 is two layers in thickness with the exception of those portions located above left and right down-facing regions 533. As with region 572, all portions of region 574 will be exposed to a cure depth of two layer thicknesses plus any desired over cure amount.

At layer 505, left and right down-facing regions 535 exist and will be exposed in association with this layer except hatch. Initially a continuing region comprising both boundaries and hatch existed in association with this layer; however, since this is not one of the primary layers, the internal portion of the continuing region will not be exposed in association with this layer. The continuing boundaries, however, will be exposed in association with this layer.

At layer 506, left and right down-facing regions 536 exist and will be exposed in association with this layer. Also, up-facing region 556 exists and will be exposed in association with this layer. Additionally, since this is one of the primary layers, continuing region 576 occupying portions of both layers 505 and 506 will be exposed. As can be seen from the figure, most of regions 576 are two layers in thickness with the expectation of those portions located above down-facing regions 535. As with region 572 and 574 all portions of region 576 will be exposed to a cure depth of two layer thicknesses plus any desired over cure amount. It is further worth noting that up-facing region 556 was initially only one layer in thickness but with the removal of the continuing region that was initially on layer 505, this up-facing region has become two layers in thickness. In this embodiment, like continuing regions, up-facing regions are exposed to achieve a cure depth of two layer thicknesses plus any desired over cure amount.

Layers 507 and 508 are analogous to layers 502 and 503 in that they include down-facing regions 537 and 538, respectively, and continuing regions 576 wherein the down-facing regions and continuing boundary regions are exposed in association with each layer and wherein the internal portion of continuing region 576 is only exposed in association with the upper layer.

Layer 509 includes left and right up-facing regions 559. As it is known that layer 509 is a secondary layer, it can be concluded that a primary layer exists immediately below it (i.e. one layer thickness) and as such it is possible that up-facing regions exposed in association with layer 509, and any other secondary layer, be given a single layer thickness cure depth plus any desired over cure amount. However, the simplification preferred in this embodiment treats all up-facing regions the same regardless of whether they are exposed in association with primary or secondary layers. As such, these up-facing regions are given an exposure appropriate to achieve a cure depth of two layer thicknesses plus any desired over cure amount. As layer 509 is not one of the primary layers, only boundary portions of the continuing regions are exposed in association with this layer, while exposure of internal portions are delayed until formation of the next layer.

Layer 510 includes both left and right up-facing regions 560 and left and right 155 continuing regions 580. Since layer 510 is one of the primary layers, all regions associated therewith will be exposed in their entirety in association with this layer and will be given exposure levels as discussed previously.

Layer 511 includes left and right up-facing regions 561, down-facing 541 and continuing regions, but since this is one of the secondary layers (i.e. not one of the primary layers) the internal portions of the continuing regions will not be exposed in association with this layer nor will down or up hatch.

Layer 512 includes up-facing regions 562 and continuing region 582. Since it is one of the primary layers, all object regions associated with this layer will be exposed in association with it.

The situation with layers 513 and 514 are analogous to those discussed above with regard to layers 509 and 510. Up-facing regions 563 except hatch and continuing boundary regions will be exposed in association with layer 513 while up-facing regions 564 including up hatch and both boundary regions and internal regions of continuing region 584 will be exposed in association with layer 514.

Layer 515 includes up-facing regions 565 and continuing regions. However, since this is one of the secondary layers, only up-facing regions except hatch and boundaries of the continuing region are exposed in association with this layer.

Layer 516 is the last layer of the object and is one of the primary layers. It only includes an up-facing region which is exposed in association therewith.

As can be seen from FIG. 3a and the description above, most regions were allowed to attain a coating depth of two layer thicknesses prior to exposing those regions, thereby increasing the probability of successfully forming the object with a resolution finer than dictated by the MRD.

Figure 3B:
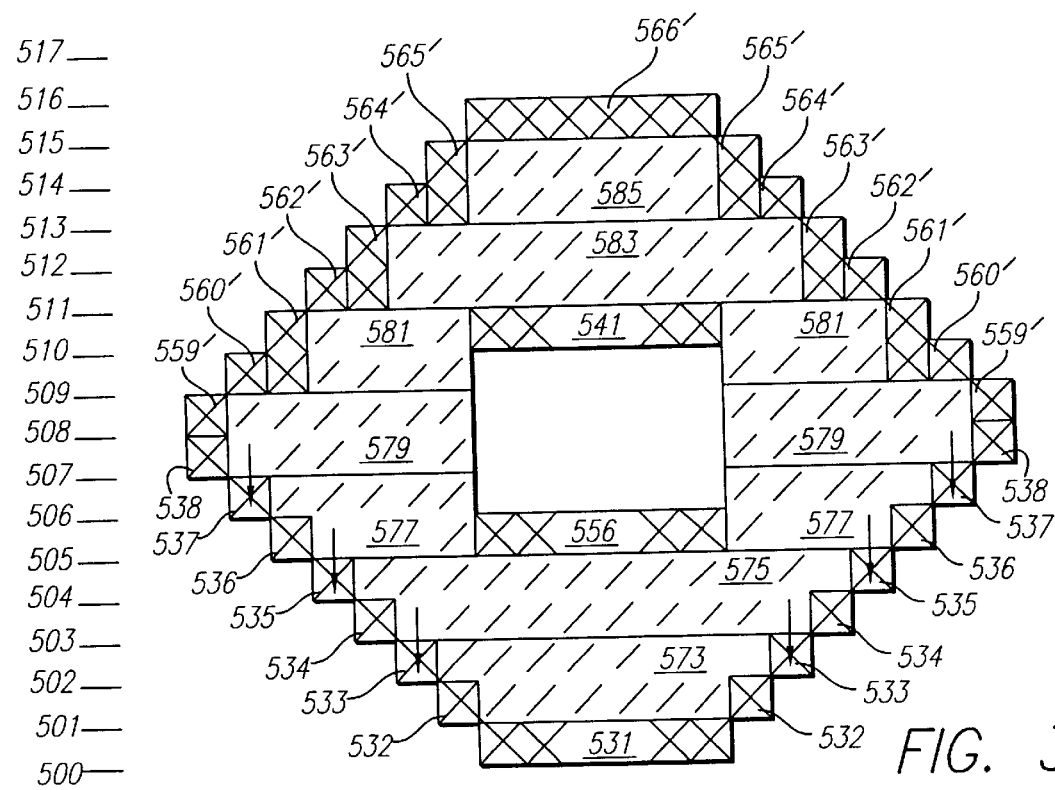

FIG. 3b depicts the formation of the object of FIG. 2a again according to the first embodiment but in this case the locations of the primary layers and secondary layers are reversed which leads to differences in association with which layers exposure of the internal portion of continuing regions will occur. These differences lead to coating thicknesses being different when forming various portions of the object. For example, when forming the last layer of the object in FIG. 3b, the coating depth is only one layer thickness as opposed to two layer thicknesses as it was in FIG. 3a. Like elements are identified with like numerals as used in FIG. 3a. Layers 501, 503, 505, 507, 509, 511, 513, and 515 are primary layers, while layers 502, 504, 506, 508, 510, 512, 514, and 516 are secondary layers. Regions 556', 559', 560', 561', 562', 563', 564', 565', and 566' are up-facing regions. Regions 531, 532, 533, 534, 535, 536, 537, 538, and 541 are down-facing regions. Regions 573, 575, 577, 579, 581, 583, 585 are continuing regions. These continuing regions include internal regions which are 20 exposed in association with the layers 503, 505, 507, 509, 511, 513, and 515, respectively, and boundary regions which are exposed in association with each layer 502 to 516.

The layers which are defined as primary layers may be based on the object's vertical position overlaying a fixed set of primary layer levels located along the z-axis. Alternatively, the primary layer levels may be defined relative to a particular layer of the object or relative to a particular feature of the object. For example, the last layer of the object may be defined as a primary layer to maximize the probability that the last layer will have a coating depth of two layer thicknesses when it is exposed.

Figure 3C:
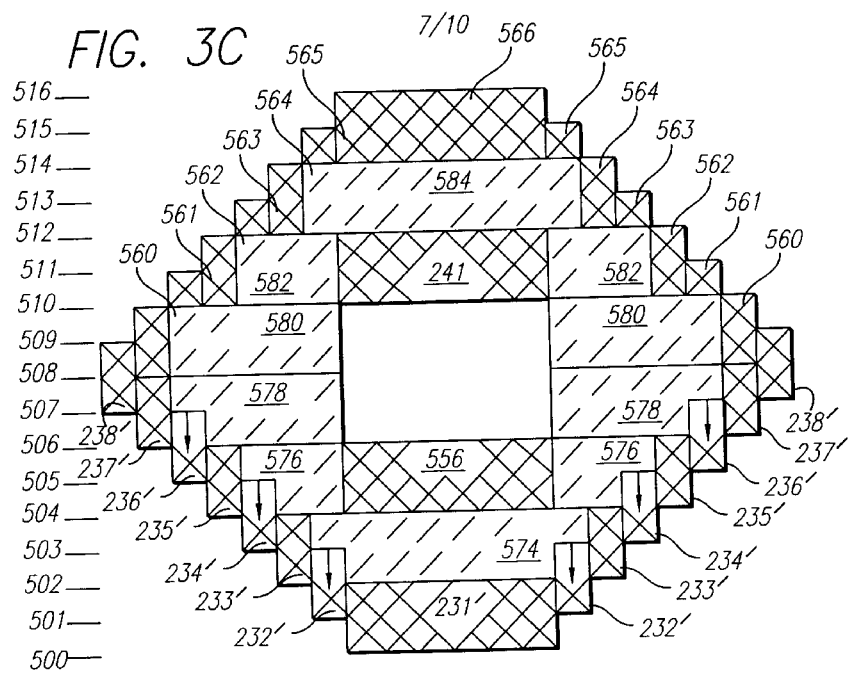
FIG. 3c depicts a side view of the object of FIG. 2a formed using the first embodiment of the instant invention where the MRD is two layer thicknesses which results in each pair of non-consecutive primary layers being separated by single intermediate secondary layers and wherein the down-facing regions are shifted up one layer thickness to accommodate a two layer thickness MSD.

FIG. 3c depicts a further example of the first embodiment as applied to the object of FIG. 2a. In this example the MRD and MSD are both considered to be two layer thicknesses. It may be considered that this embodiment takes as its starting point the modified data of FIG. 2e which is tailored to account for an MSD of two. This modified data may then be manipulated or at least exposure tailored according to the procedures of the first embodiment to yield appropriate exposure criteria for handling an MRD of two.

The down-facing features in this example are labeled as 231'–238' and 241'. These are the same designations used in FIG. 2e as the layers in association with which the down-facing features will be cured and their cure depths will remain unchanged. As some continuing regions and up-facing regions of the layers have been converted to down-facing regions because of the two layer thickness MSD, these particular continuing and up-facing regions have preferably been removed. From a comparison of FIG. 3a and 3c it can be seen that up-facing regions 559 have been removed. Also, portions of continuing region 572 and portions of continuing regions 574, 576 and 578 have been removed.

All remaining up-facing and continuing regions are the same between FIGS. 3a and 3c. As such, all remaining up-facing and continuing regions in FIGS. 3a and 3c have been labeled the same. These regions are identical to each other, since they were not over shadowed by the movement of down-facing features and since the manipulations used and the locations of primary and secondary layers are the same between the examples of the two figures.

The upper level of the primary layers is indicated with reference numerals 500, 502, 504, 506, 508, 510, 512, 514, and 516 while the level of the secondary layers is indicated with reference numerals 501, 503, 505, 507, 509, 511, 513, and 515.

Figure 4:
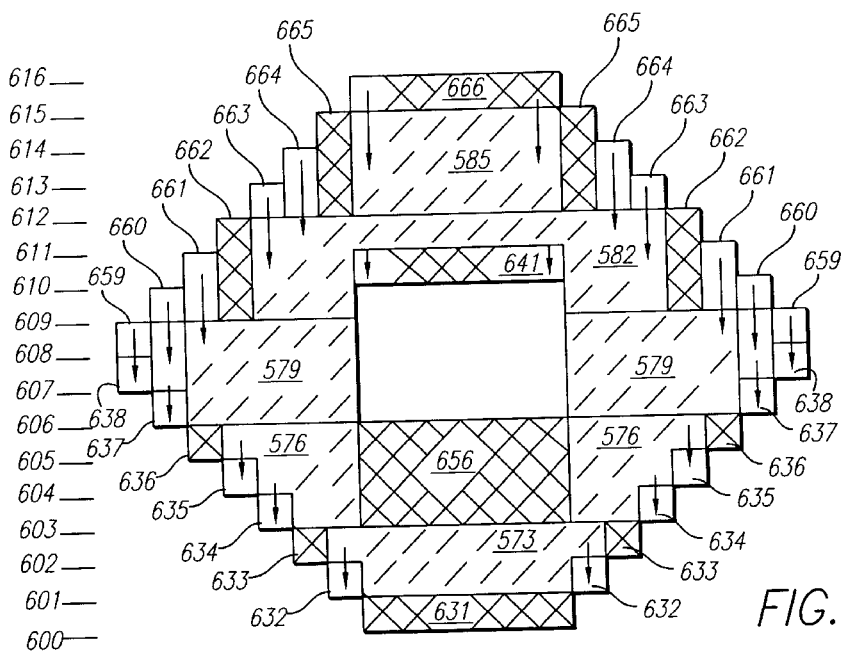
FIG. 4 depicts a side view of the same object as depicted in FIG. 2a as formed according to the teachings of the first embodiment of the instant invention where the MRD is three layer thicknesses and the MSD is one layer thickness.

FIG. 4 depicts a further example of the first embodiment as applied to the object of FIG. 2a where the MRD is considered to be three layer thicknesses and thus each consecutive pair of primary layers is separated by two secondary layers.

The upper levels of the primary layers for this example are indicated with numerals 600, 603, 606, 609, 612 and 615 while the upper levels of the secondary layers are indicated with reference numerals 601, 602, 604, 605, 607, 608, 610, 611, 613, 614, and 616. In this example the MSD of the material is considered to be one layer thickness or less. The down-facing regions except hatch or secondary layers are solidified on the layers of their initial association and with exposures appropriate to give them a one layer cure depth. The down-facing regions are indicated with reference numerals 631–638 and 641. All of these down-facing regions will receive additional exposure as a result of exposure to up-facing or continuing regions associated with higher layers. Some of these down-facing features, however, will receive more exposure than that deemed necessary or appropriate to cause adhesion. This results from a combination of: (1) some of the down-facing regions do not have upper levels that coincide with the upper level of the primary layers; and, (2) because it is preferred, for sake of simplicity, that continuing and up-facing regions be exposed to achieve a cure depth equal to the separation between primary layers (i.e. three layer thicknesses in this example) plus any desired over-cure. For regions 641, 638, 635 and 632 these extra exposures will cause the lower surface of the object to be extended downward by one layer thickness plus the over-cure amount (ignoring extra cure depth that may be associated with print through). For regions 637, 634 and 631 this extra exposure will cause the lower surface of the object to be extended downward by an over-cure amount (ignoring extra cure depth that may be associated with print through).

Internal portions of continuing regions associated with the secondary layers are not exposed while boundary portions are. All portions of continuing regions (i.e. boundary and internal portions) associated with the primary layers are exposed, as noted above, using an exposure appropriate to give a cure depth of three layer thickness plus any desired over-cure amount so as to cure not only those regions associated with the primary layers but also those regions associated with the secondary layers. These continuing regions are labeled with reference numerals 573, 576, 579, 582 and 585.

Up-facing regions associated with particular layers are exposed in association with those layers. However, to keep data processing simple it is preferred that all up-facing regions be exposed sufficiently to cause a depth of cure equal to three-layer thickness plus any desired over-cure amount. This quantity of exposure ensures a sufficient depth of cure is obtained so that the upper surface is sure to adhere to material solidified in association with the prior exposed primary layer. These up-facing regions are labeled with reference numerals 656, and 659–666.

Experiments have been performed using the first embodiment of the invention with a specific set of building parameters where objects were formed with a resolution previously thought unattainable. In these experiments an SLA-350 was used with SL 5190 resin. The desired resolution was two mils (i.e. the desired layer thickness was two mils) and the primary and secondary layers alternate one to the other. It was previously believed that for general objects a minimum layer thickness of four mils was required. The building parameters utilized are summarized in Table 5.

TABLE 5

Experimental Building Parameters Utilized in Implementing the First Embodiment Under Specific Conditions

| Parameter | Value |
| --- | --- |
| Machine | SLA 350: Manufactured by 3D Systems, Inc. of Valencia, California |
| Resin | SL 5190: Manufactured by Ciba Specialty Chemicals Corporation of Los Angeles, California and sold by 3D Systems, Inc. Critical exposure parameters associated with this material include $Ec = 17.7$ mJ/cm$^2$ and $Dp = 4.6$ mils |
| Wavelength of Prescribed Stimulation | 355 nanometers, pulsed at 20 KHz |
| MRD | More than 1 layer thickness and less than or equal to 2 layer thicknesses. For object formation with the desired resolution (i.e. 1 layer thickness), it is assumed that the MRD = ~2 layer thicknesses |
| Layer Thickness (i.e. spacing between successive layers) | 2 mils |
| Primary Layers & Secondary Layers | Alternating |
| Recoating Parameters | Use Zephyr applicator with a sweep speed of 1 inch/second, blade gap of 5 mils and blade clearance of 7 mils: (1) 2 sweeps after exposing primary layers and (2) 1 sweep after exposing secondary layers. |
| Boundaries (Down-Facing, Up-facing; and Continuing) - Patterns and Exposure Values | Expose on every layer. Cure depth = 12 mils (over-cure for 2 mil layer = 10 mils) |
| Hatch (Down-Facing, Up-Facing, and Continuing) - Patterns and Exposure Values | Expose with both X and Y vectors on primary layers only. Initially expose one type (X or Y) with an exposure appropriate to yield a 4 mil cure depth, then expose the other type (the other of Y or X) with an exposure appropriate to yield a cure depth of 5 mils (as if this is the only type being exposed). Use a 4 mil spacing between vectors, stagger the |

TABLE 5-continued

Experimental Building Parameters Utilized in Implementing the First Embodiment Under Specific Conditions

| Parameter | Value |
| --- | --- |
| | locations of the vectors by 2 mils between successive primary layers, and use an eight primary layer alternate sequencing pattern. |
| Fill (Down-Facing and Up-Facing) - Patterns and Exposure Values | Expose with both X and Y vectors on every layer. Expose an initial type (X or Y) with an exposure appropriate to yield a 9 mil cure depth, then expose a second type (the other of Y or X) with an exposure appropriate to yield a 9 mil cure depth. |

In the above table, the indicated cure depths refer to the exposure that would produce the indicated cure depth if that exposure were the only one applied. In the above experiments, no correction to the object configuration was used to account for Z-error that would result since the exposures applied to down-facing regions were larger than one layer thickness (i.e. the effective or assumed MSD is larger than one layer thickness—though from a data manipulation no correction factor was applied). Further experiments have been successful in building objects wherein a Z-error correction factor was used to produce objects of the correct size. From the above table, the net exposure applied to down-facing regions can be derived (i.e. sum of exposures for two 9 mil cure depths, a 4 mil cure depth and a 5 mil cure depth). In turn, the net cure depth can be derived as taught in U.S. Pat. Nos. 5,104,592 and 5,058,988 (i.e. ~13.7 mils in this example). As the Slicing Style (the oversized build style described in U.S. Pat. No. 5,321,622) used is configured to produce appropriately dimensioned objects only when down-facing features are cured to a depth of one layer thickness, a correction factor must be used if the cure depth is different from that. Since the layer thickness, in the above example, is two mils, the correction factor is preferably ~11.7 mils or ~6 layer thicknesses. Of course, it is possible to adjust the exposure levels so as to bring the net cure depth to an integral number of layer thicknesses.

Alternatives

It should be understood that the first embodiment, as well as other embodiments to be discussed hereinafter, are not limited to the specific parameters utilized in the examples given above but instead can be applied using various parameters. For example, the MRD may be any amount (e.g. any number of layer thicknesses, such as 3, 4, 5 or even 10 or more). In other words, the value of N layer thicknesses as measured between similar levels (e.g. upper levels) of two consecutive primary layers can be set to any workable value. Similarly, an MSD of any value can be used (e.g. any number of layer thicknesses, such as up to 3, 4, 5 or even 10 or more). The thickness between layers may be set to any appropriate amount to yield the desired resolution.

The exposure applied may form the fill regions from one or more sets of overlapping exposure lines; it may form hatch regions as completely solidified regions or as partially hollow regions from one or more sets of exposure lines; and it may form boundaries, in association with a given lamina, using multiple identical or offset exposures. Fill and hatch lines may be retracted from their respective boundary regions, and/or they may be aligned or offset from layer-to-layer. It may be desirous to form only a portion of the boundary types existing on a layer and/or only a portion of a given type of boundary. Formation of up-facing and or down-facing regions may exclude the formation of hatch even on primary layers. Boundaries may be exposed multiple times using identical exposure patterns. Alternatively, boundaries may be exposed with two or more offset patterns. For example, each boundary exposure may be offset from a previous exposure by 1, 2 or more mils, and the order of exposure may be from most exterior to most interior or vice versa. Exposure may occur via vector scanning, raster scanning, flood exposure, or a combination thereof. It is believed that any exposure technique proposed in the above incorporated patents and applications may be used. Particular selections of exposure techniques, layer thicknesses, building materials, and exposure sources may require a reanalysis of the MSD and optimum exposure parameters.

Furthermore, any stereolithographic recoating technique may be used in forming successive layers (e.g. any recoating technique discussed in the above incorporated patents and applications). Depending on the particular recoating technique selected, desired layer thickness, material, exposure source, and exposure style, a reanalysis of the MRD and optimum recoating parameters may be necessary.

The reanalyses of exposure parameters and recoating parameters and any other parameters (e.g., quantity, type, and locations of supports) may be performed either theoretically or empirically. Ability to determine appropriate values and parameters (e.g. empirically through experimentation) is within the ability of those of skill in the art.

Various other alternatives to the first embodiment and combinations between embodiments will be apparent to those of skill in the art upon study of the disclosure herein. For example, instead of blindly applying a quantity of exposure to the up-facing regions that yields a cure depth of N layers plus any desired over-cure amount, the exposure may be more selectively applied. The quantity of exposure may be based on the distance between the upper surface of the last exposed primary layer and the position of the upper surface of the layer in association with which the up-facing region will be exposed. This distance is readily ascertainable from the layer level designations associated with the last exposed primary layer and the layer in question containing the up-facing feature of interest. The quantity of exposure applied could be that necessary to achieve a cure depth equal to the distance plus any desired over-cure amount.

The boundary regions exposed in association with primary and/or secondary layers may involve a reduced set of boundaries. For example, all boundary exposures may be eliminated on one or both of the primary or secondary layers. Alternatively, only a portion of the boundaries may be exposed in association with one or both of the primary or secondary layers. The exposed portion may involve the exposure of all or part of the interior boundary regions or exterior (i.e. outward) facing boundary regions.

Various amounts of additional data manipulation, including Boolean operations, may be performed to better tailor quantities of exposure to all regions of the object. It may be possible to avoid the exposure of continuing boundaries on secondary layers or to tailor their solidification depth to better match that needed to ensure adhesion to previously solidified material.

The Second Embodiment:

The second preferred embodiment involves somewhat more sophisticated data handling but has the added benefit of having more regions coated to a depth at least as large as the MRD prior to exposing those regions. This embodiment is similar to the first embodiment with the exception that portions of continuing regions, which according to the first embodiment would be exposed in association with a particular primary layer, may not be exposed in association with that primary layer, but instead are exposed in association with the next subsequent primary layer. The portions of the continuing regions that have their exposure delayed until a next subsequent primary layer are those that are initially located within N layers of the upper extent of a down-facing region and in XY registration with that region. In other words, if a down-facing region was exposed in association with a secondary layer located between the present primary layer and immediately preceding primary layer, that portion of the internal part of the continuing region will be exposed in association with the next higher primary layer. For simplicity of exposure control, all up-facing and continuing regions may be given an exposure appropriate to yield a cure depth of 2N−1 layer thicknesses plus any desired over-cure amount. The thickness of 2N−1 layer thickness is the maximum thickness that could be separating a continuing region or an up-facing region from the region solidified immediately there below.

Alternatives to the second embodiment may apply a more tailored quantity of exposure to those unexposed primary layer continuing regions (i.e. those continuing regions that are shifted upward from an initial primary layer). An unexposed primary layer continuing region will either be exposed in association with (1) the next primary layer as a continuing region or as an up-facing region, or (2) a secondary layer located between the initial primary layer and the next primary layer, as an up-facing region. As such, a partially corrected, more tailored exposure yielding a cure depth equal to the sum of (1) any desired over-cure amount, (2) N layer thicknesses, and (3) the distance between the initial primary layer and the layer in association with which the down-facing region was exposed may be used. A more fully corrected, tailored exposure might yield a cure depth equal to the sum of (1) any desired over-cure amount, or (2) the distance between the down-facing regions and the initial primary layer, and (3) the distance between the initial primary layer and the intermediate up-facing region.

An example of this second embodiment is depicted in FIG. 5 wherein the MRD is two layer thicknesses and the MSD is one layer thickness. The layers associated with the formation of this object are indicated with reference numerals 700–716. Layers 700, 702, 704, 706, 708, 710, 712, and 716 are the primary layers while layers 701, 703, 705, 707, 709, 711, 713, and 715 are the secondary layers.

As with the first embodiment, down-facing regions are exposed in association with the layers on which they were initially found. The down-facing regions are indicated with reference numerals 731–738 and 741.

Similarly, up-facing regions 756 and 759–766 are exposed in association with the layers on which they were initially found. The cure depth to be applied to these up-facing regions may be the same or may be individually tailored. It should be noted that up-facing regions 759, 761, 763 and 765 are located on secondary layers, and as such 10 are located one layer thickness above material exposed in association with the immediately preceding primary layers. On the other hand, regions 756, 760, 762 and 764 are exposed in association with primary layers. With the exception of region 760, these regions exposed in association with primary layers are exposed coatings having a adepth of two layer thicknesses. Region 760 can be considered to have initially consisted of two regions, one that would have been formed in association with layer 708, and the other which would have been formed in association with layer 710. However, as the portion of 760 that would have been formed in association with layer 708 was located less than N layers above a down-facing region, its exposure was delayed until layer 710 or until an up-facing feature was encountered, whichever occurred first. The delay in forming this portion of region 760 illustrates a benefit of this embodiment.

The advantages of the present embodiment are further illustrated by considering the continuing regions forming a portion of the object. The object includes continuing regions 774, 774', 776, 776', 778, 778', 780, 782, 784, and 784'. Regions 774, 776, 778, 780, 782, and 784 are located two layers above previously exposed regions. Regions 774', 776', 778', and 784' are located three-layer thicknesses above previously exposed regions. Each of these primed regions can be considered to initially have contained two regions: (1) a lower region bounded from above by a primary layer but bounded from below by a down-facing region at a distance less than N layer thicknesses there below, and (2) an upper region which is bounded from above and below by consecutive primary layers. The delay in forming these regions further illustrates the benefit of this embodiment which is the formation of more coatings having a thickness at least as great as the MRD prior to exposing them and thus a higher probability of successfully forming the object.

The second embodiment may be implemented by taking a Boolean difference between the continuing regions on a primary layer and any down-facing regions located within N layers (i.e. located no more than N−1 layers below the primary layer) below the primary layer. If it is desired that tailored cure depths be applied to the up-facing and continuing regions, additional Boolean operations can be performed to achieve the necessary data to control such tailored exposure.

As with the first embodiment, many other alternatives and modifications can be made to the second embodiment and will be apparent to those of skill in the art.

The Third Embodiment

The third preferred embodiment of the instant invention involves data handling sophistication similar to that of the second embodiment. This embodiment has the added benefit that up-facing portions of layers will be given a higher probability of having coating thicknesses equal to or greater than the MRD (i.e. N layer thicknesses). An improvement in up-facing surface quality is anticipated with this embodiment. This embodiment is similar to the first embodiment with the exception that portions of continuing regions, which according to the first embodiment would be exposed in association with a particular primary layer, will not be exposed in association with that primary layer if the continuing region is located within N layers of an up-facing region. The exposure of those continuing regions in proximity (i.e. within N layers) of an up-facing region will occur in association with the exposure of the up-facing region. For simplicity of exposure control, all up-facing may be given an exposure appropriate to yield a cure depth of 2N−1 layer thicknesses plus any desired over-cure amount. The thickness of 2N−1 layer thickness is the maximum thickness that could be separating an up-facing region from the region solidified immediately therebelow.

In this embodiment, regions that will be exposed as continuing regions will have coating depths no greater than the MRD. As such, the cure depth associated with the continuing regions may be set at N layer thickness plus any desired over-cure amount.

Alternatives to the third embodiment might involve applying more tailored quantities of exposure to the up-facing regions and/or continuing regions in an analogous manner to those disclosed in the alternatives to the second embodiment.

An example of the third embodiment is depicted in FIG. 6 wherein the MRD is two layer thicknesses and the MSD is one layer thickness. The layers associated with the formation of this object are indicated with reference numerals 800–816. Layers 800, 802, 804, 806, 808, 810, 812, and 816 are the primary layers, while layers 801, 803, 805, 807, 809, 811, 813, and 815 are the secondary layers.

As with the first embodiment, down-facing regions are exposed in association with the layers on which they were initially found. Down-facing regions are indicated with reference numerals 831–838 and 841.

Up-facing regions 856 and 859–866 are exposed in association with the layers on which they were initially found. As noted above with regard to various alternatives for the second embodiment, the cure depth to be applied to these up-facing regions may be the same or may be more or less individually tailored. As illustrated by up-facing regions 866, 864, 862, 860 and 856, if an up-facing region is exposed in association with one of the primary layers, the coating depth at the time of exposure of the up-facing region will be N layer thicknesses (i.e. 2 layer thicknesses in this example) unless a down-facing region is located on one of the secondary layers located above the immediately preceding primary layer (i.e. in this example, the secondary layer immediately preceding the primary layer in association with which exposure takes place). On the other hand, if the up-facing region is found on a secondary layer, it may have a coating depth greater than N layer thicknesses (i.e. N layer thicknesses plus the distance from the up-facing region down to the immediately preceding primary layer) as illustrated by regions 865, 863, and 861. If a down-facing feature is located on the immediately preceding primary layer, the thickness of the coating will be equal to the distance between the up-facing feature and the immediately preceding primary layer as illustrated with up-facing region 859 which is bounded from below by down-facing feature 838 exposed in association with primary layer 808. Similarly, a coating depth of N layer thicknesses can result from an appropriately positioned down-facing region if the up-facing region is located on a secondary layer.

Internal portions of continuing regions are formed in association with primary layers wherein the coating thickness when exposure occurs is equal to N layer thicknesses (i.e. two layer thicknesses in this example) as illustrated by regions 884, 880, and portions of 882, 878, 876, and 874 unless the continuing region is bounded from below by a down-facing region which is located below the primary layer in which exposure is associated but above the immediately preceding primary layer as illustrated by regions 872 and portions of 874, 876, 878, and 882.

The advantages of the present embodiment can be seen in FIG. 6 as compared to FIGS. 3a, 3b, 3c, and FIG. 5 where FIG. 6 illustrates that a larger portion of the up-facing features were formed only when the coating thickness was greater than or equal to the MSD.

The third embodiment may be implemented by taking a Boolean difference of the up-facing regions located on secondary layers from the continuing regions located a on the immediately preceding primary layer. A partially effective level of tailored cure depths for up-facing regions can be achieved by exposing all up-facing regions which are located on primary layers so as to achieve an exposure of N layers plus any desired over-cure amount, whereas all up-facing regions located on secondary layers could be given an exposure appropriate to achieve a cure depth equal to 2N−1 layers plus any desired over-cure amount. Alternately, up-facing regions located on secondary layers could be given an exposure appropriate to achieve a cure depth of N plus D plus any desired over-cure amount where D is the number of layer thicknesses between the particular secondary layer and the previous primary layer. Other desired tailored cured depths can also be estimated. If it is desired that highly tailored cure depths be applied to the up-facing regions, additional Boolean operations can be performed to obtain appropriate data to control exposure.

As with the first and second embodiments, many other alternatives and modifications to the third embodiment are possible and will be apparent to those of skill in the art.

The Fourth Embodiment

A fourth embodiment of the instant invention achieves an increased proportion of regions with coatings at least as large as the MRD prior to exposing those regions. This embodiment is similar to the first embodiment with the exception that down-facing features are not necessarily exposed in association with the layers on which they are found. Instead, down-facing regions are only exposed in association with the primary layers. The quantity of exposure applied to these down-facing regions is preferably tailored by modifying the depth of cure associated with these regions to accommodate for their up-ward shift to the next higher primary layer. It is understood that in this embodiment, as well as the other embodiments disclosed herein, some circumstances may exist where it is unnecessary to tailor the quantity of exposure of down-facing regions or any other regions. In this embodiment up-facing regions are exposed in association with the cross-sections on which they are found except hatch on secondary layers. Alternatives to the fourth embodiment might involve applying a more tailored quantity of exposure to the upfacing regions in an analogous manner to that disclosed in the alternatives to the second embodiment.

Figure 7:
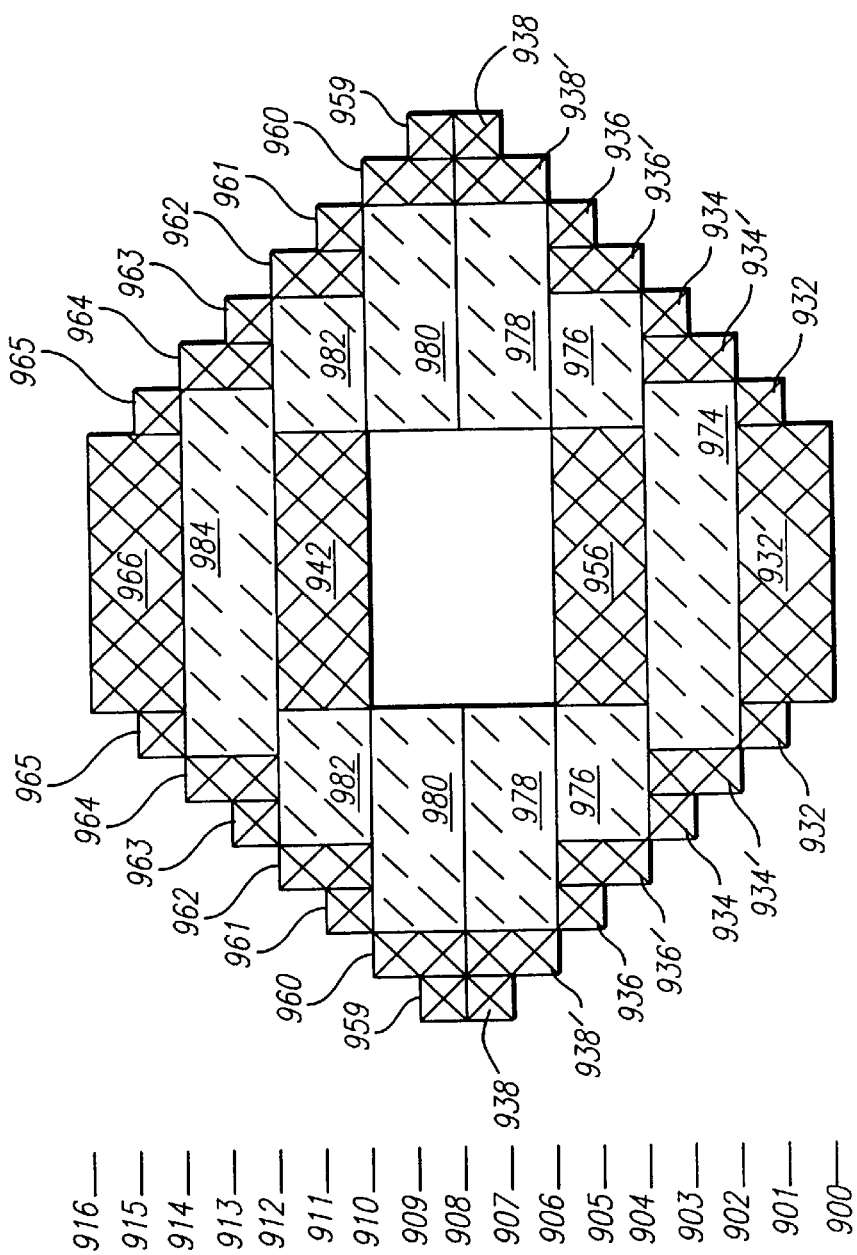
FIG. 7 depicts a side view of the same object as depicted in FIG. 2a as formed according to the teachings of the fourth embodiment of the instant invention where the MRD is two layer thicknesses and the MSD is one layer thickness.

An example of the fourth embodiment is depicted in FIG. 7 wherein the MRD is two layer thicknesses and the MSD is one layer thickness. The layers associated with the formation of this object are indicated with reference numerals 900–916. Layers 900, 902, 904, 906, 908, 910, 912, and 916 are the primary layers while layers 901, 903, 905, 907, 909, 911, 913, and 915 are the secondary layers.

As noted above, down-facing regions are only exposed in association with the primary layers. Down-facing regions 932 and 932' are exposed in association with primary layer 902. Down-facing regions 934 and 934' are exposed in association with primary layer 904. Down-facing regions 936 and 936' are exposed in association with primary layer 906. Down-facing regions 938 and 938' are exposed in association with primary layer 908. Down-facing region 942 is exposed in association with primary layer 912.

The exposure of down-facing regions 932, 934, 936, 938, and 942 occurs in association with the layers on which they were originally found. As such, it is preferred that these regions be given a quantity of exposure appropriate to achieve the cure depth initially desired for them. In other words, no modification of cure depth need be made as these regions remain unmodified.

Down-facing regions 932', 934', 936', and 938' on the other hand were not originally intended to be exposed in association with the primary layers. These regions were initially located on layers 901, 903, 905, and 907, respectively, but were shifted up to the next higher primary layer so as to meet the requirements of this embodiment. The shifting of these regions requires, for most accurate reproduction results, that they be given a quantity of exposure appropriate to achieve a cure depth equal to the sum of: (1) the desired cure depth associated with their initial positions. (In this example the desired cure depth is one layer thickness); and (2) the distance in which the data is shifted from its initial secondary layer level to the level of the next primary layer. In this example the distance is one layer thickness. As such, in this example the net desired cure depth is two layer thicknesses.

The up-facing regions in this embodiment are exposed in association with the initial layers on which they are found (with the exception of those portions overlapping any shifted down-facing data). Preferably, those up-facing regions that overlap down-facing regions are not exposed in favor of exposing the shifted down-facing regions. The thickness of coatings existing at the time these up-facing regions are exposed is typically N layer thicknesses or less depending on the distance between the layer containing the up-facing regions and the immediately preceding primary layer. In this example, these thicknesses are one or two layer thicknesses depending on whether the up-facing region is associated with a secondary layer or a primary layer, respectively. Up-facing regions 966, 964, 962, 960, and 956 are exposed in association with primary layers and have associated coating thicknesses of two layer thickness. Up-facing regions 965, 963, 961, and 959 are exposed in association with secondary layers and have associated coating depths of one layer thickness. A single exposure value may be applied to all up-facing regions or alternatively, for example, exposure values may be based on whether the up-facing region is located on a primary layer or a secondary layer with a particular spacing to the previous primary layer. If multiple secondary layers are located between consecutive primary layers, an error could result if a down-facing region was positioned such that it would be pushed upward through an up-facing region. As such, alternatives to this embodiment might limit the extent to which down-facing regions are shifted upward when up-facing regions are encountered.

Continuing regions 974, 976, 978, 980, 982, and 984 all have coating depths equal to N layer thicknesses (i.e. two layer thicknesses in this example) as dictated by the fact that down-facing regions are exposed in association with only the primary layers.

This embodiment may be implemented by shifting the down-facing regions from secondary layers up to the next primary layer. For simplicity of data manipulation, it may be desired to expose both the original data and shifted object data associated with the overlapping portion of the primary layer. Depending on the exposure applied to the shifted down-facing data versus the exposure applied to the original data (e.g. up-facing or continuing data), little error may result from the overexposure of this overlapping region. This simplified approach might be acceptable even if large errors result, if one is primarily interested in the locations of up-facing object features. On the other hand, if down-facing surface placement (i.e. the lower extent of the down-facing solidified region) is critical, it may be desired to remove whatever data (e.g. continuing data or up-facing data) was initially located on the primary layer so that the quantity of exposure applied to the shifted region is associated with only the down-facing data. This removal can be achieved through the use of Boolean differencing operations.

This embodiment has the advantage that all continuing regions are exposed only when the coating depths associated therewith are equal to or greater than the MSD.

Various alternatives and modifications to this fourth embodiment are possible. Some of these alternatives have been discussed herein above while others are discussed herein after and/or will be apparent to those of skill in the art.

The Fifth Embodiment

The fifth embodiment of the present invention can be considered a combination of the third and fourth embodiments. In this embodiment up-facing regions are exposed in association with whatever layers they are initially associated. Down-facing and continuing regions are formed on primary layers unless they are located within N layers of a higher up-facing region, in which case the portion of the down-facing and continuing regions which are in XY registration with the up-facing region are not exposed in favor of exposing the up-facing region. It is most preferred that the down-facing regions be given an appropriate quantity of exposure to position the lower extents of the object at appropriate levels. Similarly, is also most preferred that up-facing regions be given quantities of exposure that are most appropriate for the coating thicknesses from which they are formed. Up-facing regions that are exposed in favor of down-facing regions, initially located within N layers thereof, are most preferably given tailored quantities of exposure to position the lower surface of the object at the most appropriate levels.

Figure 8:
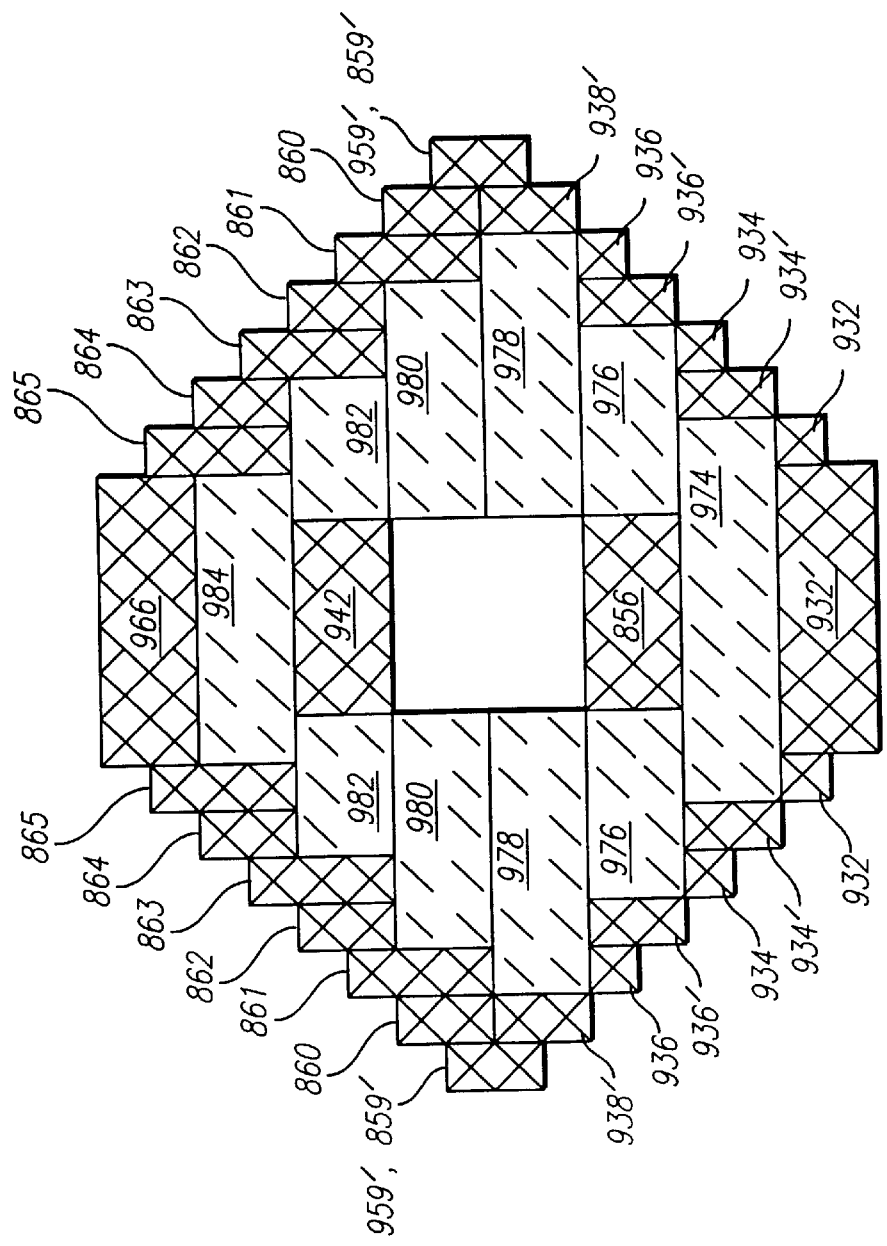
FIG. 8 depicts a side view of the same object as depicted in FIG. 2a as formed according to the teachings of the fifth embodiment of the instant invention where the MRD is two layer thicknesses and the MSD is one layer thickness.

FIG. 8 depicts an example of an object as formed according to this fifth embodiment. This figure depicts a side view of the same object as depicted in FIG. 2a wherein an MRD of two layer thicknesses and an MSD of one layer thickness is assumed. In this figure down-facing regions 932', 932, 934', 934, 936', 936, 938', and 942 are identical to those formed in association with the fourth embodiment, and are thus provided the same reference numerals as used in FIG. 7.

Up-facing regions 856 and 860–865 are identical to those formed using the third embodiment and as such have been labeled with the same reference numerals as used in FIG. 6. As discussed above, an improvement of the present embodiment occurs when a down-facing region is initially located within N layers of an up-facing region (e.g. as measured from upper extent to upper extent). This is illustrated by up-facing region 959', 859' where this up-facing feature is modified from its counterpart features 959 (FIG. 7) and 859 (FIG. 6) since it is sufficiently exposed not only to form the up-facing region 959 or 859, but also to form down-facing region 938 (FIG. 7) or 838 (FIG. 8).

Continuing regions 974, 976, 978, 980, 982, and 984 are the same as those depicted in FIG. 7 and are thus labeled with similar reference numerals.

The fifth embodiment may be implemented in a variety of ways. It may be implemented by initially applying the teachings of the fourth embodiment to the object and then taking the result of this operation as the initial data and then applying the teachings of the third embodiment.

Further Alternatives

The previously described embodiments divide the layers into groups of primary and secondary layers. In some of these embodiments, substantially all portions of primary laminae are exposed in association with primary layers as well as large portions of the secondary laminae being exposed in association with these primary layers. According to these embodiments, relatively small portions of the secondary laminae are exposed in association with the secondary layers. It is believed, however, that the enhanced object formation techniques can be effectively applied when more than a majority portion (i.e. greater than 50% and preferably greater than 75% of the area, on average) of the primary laminae are exposed in association with the primary layers along with a majority portion (i.e. greater than 50% and preferably greater than 75% of the area, on average) of the secondary laminae being also formed in association with the primary layers. In other words, if a majority, on average, of the exposure is applied in association with primary layers and a minority (less than 50% and preferably less than 25%), on average, is applied in association with secondary layers, enhanced object resolution is believed possible due to associated reduction in the effective MRD.

In some of the embodiments and their alternatives, discussed herein above, quantities of exposures are preferably tailored for forming down-facing regions to particular depths; however, the positioning of down-facing surfaces (i.e. the lower extents of down-facing regions) may not be that critical in some circumstances and thus the particular quantities of exposure applied thereto may not be that critical so long as sufficient exposure is given to ensure adequate structural integrity of the object. Such circumstances might include those where the object's up-facing features need high resolution such as in various tooling applications where the object, reproductions thereof, inversions thereof, or the like are used as tools for the production of further objects.

Implementation of the methods described herein to form apparatus for forming objects according to the teachings herein can be implemented by programing an SLA control computer, or separate data processing computer, through software or hard coding to manipulate the data associated with the object. Alternatively, implementation can occur without modifying any or some of the data, but instead by programming the SLA to modify the way the system interprets existing data.

Methods and apparatus in any embodiment can be modified according to the alternative teachings explicitly described in association with one or more of the other embodiments. Furthermore, the methods and apparatus in these embodiments and their alternatives can be modified according to various teachings in the above incorporated patents and applications. Examples of such modifications include: (1) Forming objects upside down instead of right side up; (2) using undersized or other sizing styles as opposed to the oversized styles illustrated above; (3) using data interpolation techniques; (4) using trapped volume or other features identifications; (5) using other vector types; (6) using multiple skinning layers; (7) using multiple offset boundaries; (8) using other recoating techniques like a counter rotating roller, ink jet dispensers, a rigid or flexible doctor blade, a brush; and (9) the like.

It is believed that the teachings herein can be applied to other RP&M technologies in order to achieve higher resolution in a simpler manner than typically believed possible.

Enhanced Recoating

As noted above in Table 5, the utilization of special recoating techniques can be useful in the implementation of the preferred embodiments of the instant invention. These special recoating techniques are believed to be useful whenever the combination of: (1) layer thicknesses are smaller than any leading edge bulge that results from the particular recoating device and parameters being used; and (2) not all portions of layers are exposed in association with each layer (i.e. at least some layers are not exposed or only partially exposed). These techniques are believed particularly useful when the layer thickness is less than about two thirds to one half the height of the leading edge bulge (with SL 5190 and the Zephyr recoater as depicted in FIGS. 1a and 1b and using the parameters in Table 5, leading edge bulge is typically 3–4 mils).

Two problems exist with leading edge bulge: (1) the error resulting from solidifying a region of the object where a bulge in the surface of the liquid is converted to a solidified bulge in the object, and especially when that region is an outward-facing region of the object whereby a resulting distortion in external dimensions of the object occurs; and (2) the accumulated error that can result from leading edge bulges which were solidified on previous layers such that they reinforce each other (i.e. making larger bulges) as subsequent layers are formed and solidified. These accumulated errors can lead to excessive distortions of the objects. More catastrophically, they can lead to the inability to complete the formation of the object due to collisions between the overgrown object and the recoating device. It should be understood that these two problems are not independent in that the first problem gives rise to the second problem. If the magnitude of the first problem is large enough (even without reinforcement), it can cause catastrophic failure during building.

The first problem can only be handled by using recoating devices, styles, set up parameters, and delays in exposure after recoating so as to minimize the magnitude of these errors.

The second problem can be handled using recoating styles that do not allow the reinforcement of bulges from layer to layer. Up until the now it has been satisfactory to simply alternate the direction of sweeping of the recoating device between successive layers. This alternating direction causes the location of the bulge to occur on opposite sides of successive laminae. If the bulge produced is less than the layer thickness, the height of any bulge formed is substantially limited to that produced by a single layer deposition (i.e. the first problem). Thus, the growth of the bulge (i.e. the second problem) is eliminated or at least drastically reduced.

However, with the use of layer thickness smaller than bulge heights, this simple alternating technique may not be successful in eliminating or sufficiently controlling the growth of leading edge bulges. As this simple alternating approach has produced problems with regard to the production of objects exposure parameters outlined in Table 5, improved recoating techniques for handling such situations have been developed.

One example of an embodiment of an improved recoating technique is outlined in Table 5 for an object that will be formed from primary layers which alternate with secondary layers. In this embodiment an even number of passes (e.g. two passes) of the recoating device are made to aid in the formation of a coating over a primary or secondary, fully or partially exposed, lamina (i.e. over a lamina which is exposed in association with a primary or secondary layer to form a coating for a next secondary or primary layer). After exposure of this coating, an odd number of passes (e.g. one pass) is formed over this secondary or primary lamina to form a primary or secondary subsequent layer. This recoating technique results in the sweeping of the recoater in opposite directions over successive primary laminae formed from the primary layers. As the primary laminae are the main laminae where large solidified regions exist, it is ensured that the leading edge bulge deposited on these laminae are located on opposite sides of the successive primary laminae thereby increasing the probability that object formation will be successful. It should further be noted, for this example, that the successive primary laminae are spaced two layer thicknesses apart so that this technique can readily handle layer thicknesses which are approximately two thirds to one half the size of the leading edge bulges.

The primary or secondary layers (i.e. primary or secondary laminae) may each be coated over with an odd number or even number of passes. If different numbers of passes are used on the primary and secondary layers, it is preferred that the higher number of passes be used in coating over the primary laminae, if a dispenser is being used. In this situation, the higher number of passes may lead to better wetting of the primary laminae which typically have more exposed area than the secondary laminae. Alternatively, if a means for striking off, or dragging material, is used (e.g., a doctor blade, rake, brushes, or a film), it may be more beneficial to use a lower number of passes over the primary layers as the strike off means, or dragging means, may be more likely to cause dewetting of the surface of the primary laminae when higher numbers of passes are used.

If every fourth layer is to be a primary layer and thus three secondary layers will be formed between each consecutive pair of primary layers, it is preferred that the coatings for the four consecutive layers (e.g. one primary layer and three secondary layers) include the use of an odd number of passes on any three of the layers and an even number of passes on the fourth layer. If these layers are formed with one or two passes each of a despensing recoater, it is preferred that the double pass be performed over the primary laminae.

Other sweeping pass schemes may also be used in forming coatings over the set of four layers. These other schemes preferably result in a total odd number of passes being formed in the coatings of the four layers combined such that the sweeping direction(s) over consecutive primary layers are opposite one to the other.

In other embodiments, whether including an even number or odd number of secondary layers in each group of layers (i.e. consecutive layers that include one primary layer and the number of secondary layers located between consecutive primary layers), it is preferred that an odd total number of passes of the recoater occur over the group as a whole. This will result in a last sweep over successive primary laminae occurring in opposite directions.

For embodiments where an even number of secondary layers exist between consecutive primary layers, the simplest recoating technique results in a single sweep over each lamina; however, in cases where it is desired to use multiple sweeps (either even or odd) over any single layer, the preferred number of additional sweeps (odd or even) over remaining layers of the group should make the total number of sweeps for the group odd.

A preferred feature of these enhanced recoating techniques involves sweeping a recoating device over previously formed laminae when forming layers of material adjacent to the laminae. The sweeping of the recoating device preferably varies (i.e. sweeps in different directions and/or orders) during formation of some of these coatings. It is especially preferred that the variation in sweeping occurs over those neighboring layers laminae where extensive exposure has occurred. These neighboring layers are preferably not immediately adjacent layers, but instead are preferably separated by one or more intermediate layers that have been less extensively exposed.

Extensively exposed layers may be considered those wherein more than 50%, 75%, or may be even 90% of the intended cross-sectional area of the lamina associated with the layer is exposed. Less extensively exposed layers may be considered those wherein less than 50%, 25% or even 10% of the intended crosssectional area of the lamina associated with the layer is exposed.

It is noted that the extensiveness of exposure of a layer to be coated over may be determined by considering where successful recoating must occur so that successful formation of the next lamina may occur. For example, it is known that no exposure will occur in association with a portion of a layer that is immediately located above up-facing regions that were exposed in association with the preceding lamina. No coating need be successfully formed over those portions.

Furthermore, in considering the extensiveness of exposure, it may be desirable to consider the maximum width of solidified material on the previous lamina. This may be accomplished by a critical circle analysis as described in a number of the patents and applications previously referenced and known in the art. Whether a lamina is considered extensively exposed or not could, in this case, be based on a predetermined critical circle radius, or the like. Laminae with radii above the predetermined limit would be considered extensively exposed while laminae with radii below the predetermined limit would be considered less extensively exposed. It is within the skill of the art to perform experiments to derive an acceptable value for this predetermined limit.

Furthermore, the extensiveness of exposure may involve a consideration as to the exposure style used in forming the last lamina. In other words, if the object is being formed such that all object portions are to be solidified (e.g. with the ACES build style), the extent exposure for a given lamina may be classified differently than if the object were to be formed such that liquid remains within the walls of the object (e.g. with a investment casting build style). When considering the exposure style used, extensiveness of exposure may be based on the absolute percentage of exposure of individual layers or alternatively, it may be based on the relative area percentage of exposure applied to each layer as compared to the area percentage that would be applied if the entire laminae were to be exposed.

Different directions of sweeping, for example, include sweeping in opposite directions or in crossing directions. Different orders of sweeping for example include: (1) sweeping over a first laminae, to form a coating adjacent thereto, from left to right on a first pass and then sweeping over the first laminae right to left on a second pass; and then (2) sweeping over a subsequent laminae, to form a coating adjacent thereto, from right to left on a first pass and then left to right on a second pass.

Table 6 below provides several examples of sweeping techniques that might be utilized according to this aspect of the invention.

TABLE 6

Examples of Sweeping Techniques

| Layer Pattern<br>F = Primary Layer,<br>S = Secondary Layer,<br>() Groups of Layers | Passes Per Layer | Passes Per Group | Direction Change/<br>Order Change<br>Over Successive Primary layers |
|---|---|---|---|
| (F,S) (F,S)(F,S) | (2,1)(2,1)(2,1) | 3 | No/Yes |
| (F,S) (F,S)(F,S) | (1,2)(1,2)(1,2) | 3 | Yes/No |
| (F,S,S)(F,S,S)(F,S,S) | (2,2,1)(2,2,1)(2,2,1) | 5 | No/Yes |
| (F,S,S)(F,S,S)(F,S,S) | (1,2,2)(1,2,2)(1,2,2) | 5 | Yes/No |
| (F,S,S)(F,S,S)(F,S,S) | (2,1,2)(2,1,2)(2,1,2) | 5 | No/Yes |
| (F,S,S)(F,S,S)(F,S,S) | (1,0,0)(1,0,0)(1,0,0) | 1 | Yes/No |
| (F,S,S)(F,S,S)(F,S,S) | (2,1,0)(2,1,0)(2,1,0) | 3 | No/Yes |
| (F,S,S,S)(F,S,S,S)(F,S,S,S) | (2,1,1,1)(2,1,1,1)(2,1,1,1) | 5 | No/Yes |
| (F,S,S,S)(F,S,S,S)(F,S,S,S) | (1,2,2,2)(1,2,2,2)(1,2,2,2) | 7 | Yes/No |
| (F,S,S,S)(F,S,S,S)(F,S,S,S) | (3,2,2,2)(3,2,2,2)(3,2,2,2) | 9 | Yes/Yes |
| (F,S,S,S)(F,S,S,S)(F,S,S,S) | (5,2,1,1)(5,2,1,1)(5,2,1,1) | 9 | Yes/Yes |

Though particular embodiments have been described and illustrated and many alternatives proposed, many additional embodiments and alternatives will be apparent to those of skill in the art upon review of the teachings herein. As such, these embodiments are not intended to limit the scope of the invention, but instead to be exemplary in nature.

We claim:

1. A method of forming at least a portion of three-dimensional object from a plurality of adhered laminae, comprising the steps of:

forming successive layers of material adjacent to any last formed layers of material in preparation for forming subsequent laminae of the object;

identifying some non-consecutive layers as primary layers;

identifying layers intermediate to the primary layers as secondary layers; and exposing the material to prescribed stimulation, in association with the primary layers, to form substantially all portions of the laminae associated with the primary layers and to form portions of laminae associated with the secondary layers; and exposing at least a portion of the material to prescribed stimulation, in association with the secondary layers, to form at least some outward-facing portions of the laminae associated with the secondary layers;

such that the at least portion of the three-dimensional object is formed from a plurality of adhered laminae with an object resolution substantially equal to or better than the resolution defined by a thickness between successive layers.

2. The method of claim 1 wherein every other layer is a primary layer.

3. The method of claim 1 wherein the at least some outward-facing portions of the laminae associated with the secondary layers include substantially all outward-facing portions of the laminae associated with the secondary layers.

4. The method of claim 1 wherein the at least some outward-facing portions of the laminae associated with the secondary layers includes up-facing portions of the laminae associated with the secondary layers.

5. The method of claim 3 wherein exposure occurs via vector data and the step of exposing, in association with the secondary layers, includes exposure of boundaries, downward facing regions and up-ward facing regions associated with the secondary layers.

6. The method of claim 5 wherein the boundaries exposed in association with the secondary layers include down-facing boundaries, up-facing boundaries, and continuing boundaries.

7. The method of claim 1 wherein a spacing between successive layers is less than a minimum recoating depth (MRD) which is considered desirable for forming coatings over entirely solidified laminae.

8. The method of claim 7 wherein a spacing between successive primary layers is at least as large as the MRD of the material.

9. The method of claim 7 wherein data representing the object is tailored data to account for a minimum solidification depth of the medium being greater than the thickness between successive layers.

10. The method of claim 1 wherein every 4th layer is a primary layer.

11. The method of claim 1 wherein the spacing between the primary layers is variable.

12. The method of claim 1 additionally comprising the step of manipulating cross-sectional data representing laminae of the object to produce modified data descriptive of portions of laminae to be exposed in association with primary and secondary layers.

13. The method of claim 1 wherein at least some of the steps of exposing material occur simultaneously with the step of forming successive layers.

14. A method of forming at least a portion of a three-dimensional object from a plurality of adhered laminae, comprising the steps of:

forming successive layers of material adjacent to any last formed layers of material in preparation for forming subsequent laminae of the object, some of the successive layers being primary layers spaced one from the other and some being secondary layers positioned intermediate to the primary layers, wherein a spacing between successive primary layers is greater than or equal to an MRD of the material and the spacing between successive layers is less than the MRD of the material;

selectively exposing the primary layers to form at least majority portions of primary laminae including at least a portion of the external boundary regions of the laminae in association therewith; and selectively exposing the secondary layers to form at least minority portions of the secondary laminae in association therewith;

wherein the exposure of the primary layers and secondary layers results in adhesion of laminae to previously formed laminae so as to form the at least portion of the object from a plurality of adhered laminae with a resolution substantially equal to or better than the resolution defined by a thickness between successive layers.

15. A method of forming at least a portion of a three-dimensional object from a plurality of adhered laminae, comprising the steps of:

forming successive layers of material adjacent to any last formed layers of material in preparation for forming subsequent laminae of the object;

identifying some non-consecutive layers as primary layers;

identifying layers intermediate to the primary layers as secondary layers;

identifying continuing regions of the object as those regions which are neither up-facing nor down-facing;

identifying outward-facing-regions of the object as those regions which are either up-facing, down-facing or both;

exposing at least portions of material to prescribed stimulation, in association with the primary layers, to form at least portions of laminae associated with the primary layers and to form portions of laminae associated with the secondary layers; and exposing at least portions of the material to prescribed stimulation, in association with the secondary layers, to form at least a portion of the outward-facing regions of the laminae associated with the secondary layers;

wherein exposure of interior portions of continuing regions associated with the primary and secondary layers occurs substantially in association with only the primary layers or in association with exposure of outward-facing portions associated with the secondary layers, such that the at least portion of the three-dimensional object is formed from a plurality of adhered laminae with an object resolution substantially equal to or better than the resolution defined by a thickness between successive layers.

16. A method of forming at least a portion of a three-dimensional object from a plurality of adhered laminae, comprising the steps of:

forming successive layers of material adjacent to any last formed layers of material in preparation for forming subsequent laminae of the object, some of the successive layers being primary layers spaced one from the other by an odd number of secondary layers positioned intermediate therebetween;

selectively exposing the primary layers to form at least majority portions of primary laminae in association therewith and to form at least portions of the secondary laminae; and selectively exposing the secondary layers to form at least minority portions of the secondary laminae in association therewith;

wherein the exposure of the primary layers and secondary layers results in adhesion of laminae to previously formed laminae so as to form the at least portion of the object from a plurality of adhered laminae;

wherein the step of forming the primary layers and at least some of the secondary layers comprises the step of sweeping a recoating device at or near a surface of the material a desired number of times such that the sweeping directions and/or order of sweeping over successive primary laminae vary.

17. A method of forming at least a portion of a three-dimensional object from a plurality of adhered laminae, comprising the steps of:

forming successive layers of material adjacent to any last formed layers of material in preparation for forming subsequent laminae of the object, some of the successive layers being primary layers spaced one from the other by an even number of secondary layers positioned intermediate therebetween;

selectively exposing the primary layers to form at least majority portions of primary laminae in association therewith and to form at least portions of secondary laminae;

selectively exposing the secondary layers to form at least minority portions of the secondary laminae in association therewith;

wherein the exposure of the primary layers and secondary layers results in adhesion of laminae to previously formed laminae so as to form the at least portion of the object from a plurality of adhered laminae;

wherein the step of forming the primary and at least some of the secondary layers comprises the step of sweeping a recoating device at or near a surface of the material a desired number of times such that the sweeping directions over successive primary laminae occur in different directions or a different order of directions and wherein a different number of sweeps of the recoating device are made over at least two laminae within a group of laminae comprising a primary lamina, a next consecutive primary lamina and all secondary laminae therebetween.

18. A method of forming at least a portion of a three-dimensional object from a plurality of adhered laminae, comprising the steps of:

identifying some non-consecutive cross-sections as primary crosssections;

identifying cross-sections intermediate to the primary cross-sections as secondary cross-sections;

forming, in association with the primary cross-sections, substantially all portions of laminae associated with the primary cross-sections and forming portions of laminae associated with secondary cross-sections; and forming, in association with the secondary cross-sections, at least some outward-facing portions of the laminae associated with the secondary cross-sections including at least some of any flat up-facing or flat down-facing regions;

such that the at least portion of the three-dimensional object is formed from a plurality of adhered laminae with an object resolution substantially equal to or better than the resolution defined by a thickness between successive layers.

19. The method of claim 16 wherein the forming steps include the steps of selectively dispensing material.

20. The method of claim 16 wherein the forming steps include the steps of forming layers of a powder material and selectively solidifing those layers of powder material.

21. The method of claim 16 wherein the forming steps include the steps of forming layers of a liquid photopolymer material and selectively solidifying those layers of material.

* * * * *

UNITED STATES PATENT AND TRADEMARK OFFICE
CERTIFICATE OF CORRECTION

PATENT NO.   : 5,902,538
DATED        : May 11, 1999
INVENTOR(S)  : Kruger et al.

It is certified that error appears in the above-identified patent and that said Letters Patent is hereby corrected as shown below:

Column 1,
Line 31, "the threedimensional object" should read -- the three-dimensional object --.

Column 2,
Line 12, "Nos. 081722326" should read -- Nos. 08/172,326 --.
Line 16, "of threedimensional" should read -- of three-dimensional --.

Column 11,
Line 36, " "associated," is" should read -- is "associated," is --.

Column 13,
Line 51, "Lip-facing hatch" should read -- up-facing hatch --.

Column 17,
Line 17, "with this associated" should read -- their associated --.
Line 62, "assocation with the exception" should read -- association with --.
Line 63, "of downfacing hatch this layer." should read -- this layer with the exeception of down-facing hatch."

Column 18,
Line 63, "right 155 continuing" should read -- right continuing --.

Column 19,
Line 48, "which are 20" should read -- which are --.

Column 24,
Line 58, "as such 10" should read -- as such --.
Line 64, "a adepth" should read -- a depth --.

Column 31,
Line 46, "objects exposure" should read -- objects per the exposure --.
Line 49, "improved recosting" should read -- improved recoating --.

Column 32,
Line 60, "neighboring layers laminae" should read -- neighboring laminae --.

UNITED STATES PATENT AND TRADEMARK OFFICE
CERTIFICATE OF CORRECTION

PATENT NO. : 5,902,538
DATED : May 11, 1999
INVENTOR(S) : Kruger et al.

It is certified that error appears in the above-identified patent and that said Letters Patent is hereby corrected as shown below:

<u>Column 33,</u>
Line 68, "of exposure applied to each layer" should read -- of exposure --.
Line 69, "compared to the area precentage that would be applied if the" should read -- applied if the --.
Line 70, "be exposed." should read -- be exposed using that particular build style. --.

Signed and Sealed this

Twenty-second Day of January, 2002

*Attest:*

*Attesting Officer*

JAMES E. ROGAN
*Director of the United States Patent and Trademark Office*